(12) United States Patent
Murokawa et al.

(10) Patent No.: US 11,691,919 B2
(45) Date of Patent: Jul. 4, 2023

(54) POWDERED QUICK-SETTING AGENT, QUICK-SETTING MATERIAL, QUICK-SETTING MATERIAL CURED PRODUCT, AND SPRAYING METHOD

(71) Applicant: Denka Company Limited, Chuo-ku (JP)

(72) Inventors: Takamitsu Murokawa, Itoigawa (JP); Masahiro Iwasaki, Itoigawa (JP); Shunichi Mishima, Itoigawa (JP); Katsuichi Miyaguchi, Tsukuba (JP); Akitoshi Araki, Itoigawa (JP); Yasuhiro Ishii, Itoigawa (JP); Kenji Hatta, Itoigawa (JP); Takanori Sakakibara, Itoigawa (JP)

(73) Assignee: Denka Company Limited, Chuo-ku (JP)

( * ) Notice: Subject to any disclaimer, the term of this patent is extended or adjusted under 35 U.S.C. 154(b) by 385 days.

(21) Appl. No.: 16/768,434

(22) PCT Filed: Mar. 12, 2019

(86) PCT No.: PCT/JP2019/010076
§ 371 (c)(1),
(2) Date: May 29, 2020

(87) PCT Pub. No.: WO2019/176957
PCT Pub. Date: Sep. 19, 2019

(65) Prior Publication Data
US 2020/0385311 A1    Dec. 10, 2020

(30) Foreign Application Priority Data

Mar. 14, 2018  (JP) ................ 2018-046464
Sep. 25, 2018  (JP) ................ 2018-178512
Oct. 1, 2018   (JP) ................ 2018-186484
Oct. 5, 2018   (JP) ................ 2018-189748

(51) Int. Cl.
| | |
|---|---|
| *C04B 28/26* | (2006.01) |
| *C04B 22/00* | (2006.01) |
| *C04B 22/06* | (2006.01) |
| *C04B 22/10* | (2006.01) |
| *C04B 22/14* | (2006.01) |
| *C04B 111/00* | (2006.01) |

(52) U.S. Cl.
CPC .......... *C04B 28/26* (2013.01); *C04B 22/0093* (2013.01); *C04B 22/064* (2013.01); *C04B 22/10* (2013.01); *C04B 22/147* (2013.01); *C04B 22/148* (2013.01); *C04B 2111/00172* (2013.01); *C04B 2111/00637* (2013.01)

(58) Field of Classification Search
CPC ......... C04B 7/32; C04B 12/04; C04B 18/141; C04B 22/0093; C04B 22/064; C04B 22/10; C04B 22/106; C04B 22/142; C04B 22/147; C04B 22/148; C04B 28/04; C04B 28/26; C04B 40/0042; C04B 2103/12; C04B 2111/00155; C04B 2111/00637; Y02W 30/91
See application file for complete search history.

(56) References Cited

U.S. PATENT DOCUMENTS

| | | | |
|---|---|---|---|
| 7,727,330 | B2 | 6/2010 | Ordonez et al. |
| 9,216,925 | B2 | 12/2015 | Ferrari et al. |
| 2009/0217844 | A1 | 9/2009 | Ordonez et al. |
| 2014/0296370 | A1 | 10/2014 | Ferrari et al. |

FOREIGN PATENT DOCUMENTS

| | | | |
|---|---|---|---|
| CN | 1964931 A | | 5/2007 |
| CN | 102219425 A | | 10/2011 |
| CN | 104507893 A | | 4/2015 |
| CN | 105036629 A | * | 11/2015 |
| JP | 57-100058 A | | 6/1982 |
| JP | 2-1104 B2 | | 1/1990 |
| JP | 10-259047 A | | 9/1998 |
| JP | 2002-220270 A | | 8/2002 |
| JP | 2003-12356 A | | 1/2003 |
| JP | 2006-335586 A | | 12/2006 |
| JP | 2010-180109 A | | 8/2010 |
| JP | 2011-46574 A | | 3/2011 |
| JP | 2011-84440 A | | 4/2011 |
| JP | 2011-219302 A | | 11/2011 |
| JP | 2014-111516 A | | 6/2014 |
| JP | 5603016 B2 | | 10/2014 |
| KR | 10-1442668 B1 | * | 11/2014 |
| WO | WO 2007/096686 A1 | | 8/2007 |
| WO | WO 2011/096925 A1 | | 8/2011 |
| WO | WO 2012/084716 A1 | | 6/2012 |

OTHER PUBLICATIONS

Machine Translation of Japanese Patent Specification No. JP 2010-180109 A. (Year: 2010).*
Chilean Office Action dated Jun. 18, 2021 in Chilean Patent Application No. 202001455 (with partial English translation), 23 pages.
Japanese Office Action dated Jan. 14, 2020 in Japanese Patent Application No. 2019-565573, 2 pages.
International Search Report dated Jun. 4, 2019 in PCT/JP2019/010076 filed on Mar. 12, 2019, 1 page.
Combined Chinese Office Action and Search Report dated Apr. 18, 2022 in Chinese Patent Application No. 20198006165.0, 8 pages.

(Continued)

*Primary Examiner* — Anthony J Green
(74) *Attorney, Agent, or Firm* — Oblon, McClelland, Maier & Neustadt, L.L.P.

(57) ABSTRACT

A powdered quick-setting agent containing a calcium aluminate and a sodium silicate, preferably further containing at least one selected from the group consisting of an alkali metal sulfate, an alkaline earth metal sulfate, and an aluminum sulfate.

13 Claims, No Drawings

(56) References Cited

OTHER PUBLICATIONS

Combined Chinese Office Action and Search Report dated Sep. 28, 2021 in corresponding Chinese Patent Application No. 201980006165.0 (with English Translation of Category of Cited Documents), 8 pages.
Extended European Search Report dated Dec. 9, 2020 in European Patent Application No. 19766507.8, 7 pages.
Indian Office Action dated Jan. 7, 2022 in Indian Patent Application No. 202017022319, 6 pages.

* cited by examiner

POWDERED QUICK-SETTING AGENT, QUICK-SETTING MATERIAL, QUICK-SETTING MATERIAL CURED PRODUCT, AND SPRAYING METHOD

TECHNICAL FIELD

The present invention relates to a powdered quick-setting agent, a quick-setting material, a quick-setting material hardened product and a spraying method, and especially to a powdered quick-setting agent, a quick-setting material, a quick-setting material hardened product and a spraying method used in the field of civil engineering and construction.

BACKGROUND ART

Heretofore, as a quick-setting technique for cement, for example, a technique of separately feeding under pressure a powdered or suspended cement quick-hardening material that contains a calcium aluminate and an inorganic sulfate as main ingredients, and concrete, then combining and mixing them, and hardening the resultant mixture for 30 seconds to several tens of minutes (for example, see PTL 1). On the other hand, alum is known as a hardening accelerator for cement, and is used as a part of a quick-setting agent for spraying (for example, see PTL 2).

As quick-setting agents currently available on the market, those containing, as main ingredients, any of water glass, an alkali metal aluminate, a combination of an alkali metal aluminate and an alkali metal carbonate, a combination prepared by further combining an alkali metal aluminate or a combination of an alkali metal aluminate and an alkali metal carbonate with a calcined alunite, and a calcium aluminate are known.

CITATION LIST

Patent Literature

PTL 1: JP 57-10058 A
PTL 2: JP 2-1104 A

SUMMARY OF INVENTION

Technical Problem

However, water glass, an alkali metal aluminate, an alkali metal alkali carbonate, and a combination prepared by further combining an alkali metal aluminate or a combination of an alkali metal aluminate and an alkali metal carbonate with a calcined alunite are poor in quick-setting performance. Consequently, for example, in a water contact environment where water exists always or frequently, such as a spring-fed-fed area, spraying treatment is especially difficult. Specifically, there is a problem that a spraying material could hardly realize good adhering performance in a water contact environment. In addition, in a spring-fed area, when a quick-setting material is pulverized and combined with cement, the resultant mixture of the pulverized quick-setting material and cement needs to lose flowability to an extremely high extent and, in addition, excellent setting performance and strength expression are indispensable for the mixture. Further, when a spray-treated spring-fed area is cracked after spraying treatment, but when repairing the area is unnecessary or easy, such spraying treatment is extremely significant from the viewpoint of maintenance.

From the above, an object of the present invention is to provide a powdered quick-setting agent which, when used as a quick-setting material, shows good adhesiveness even in a water contact environment and which can exhibit an excellent repairing action on cracked sites.

The present inventors have made various investigations for the purpose of solving the above-mentioned problems and, as a result, have found that, by using a specific quick-setting agent, adhesiveness of spray concrete in a water contact environment is improved and, in addition, even when spray concrete is cracked, it still has a self-repairing performance, and have completed the present invention. Specifically, as described below, the present invention includes a first aspect, a second aspect, a third aspect and a fourth aspect of the invention. Hereinunder the first to fourth aspects of the invention will be collectively referred to as the present invention.

Solution to Problem

<First Aspect of Invention>
[1] A powdered quick-setting agent containing a calcium aluminate and a sodium silicate.
[2] The powdered quick-setting agent according to [1], wherein the molar ratio of $SiO_2$ to $Na_2O$ in the sodium silicate ($SiO_2/Na_2O$) is 0.5 to 1.5.
[3] The powdered quick-setting agent according to [1] or [2], wherein the number of hydrates in the sodium silicate is 9 or less.
[4] The powdered quick-setting agent according to any of [1] to [3], wherein the molar ratio of CaO to $Al_2O_3$ in the calcium aluminate ($CaO/Al_2O_3$) is 2.0 to 3.0.
[5] The powdered quick-setting agent according to any of [1] to [4], further containing at least one selected from the group consisting of an alkali carbonate, a calcium hydroxide and an alum.
[6] The powdered quick-setting agent according to any of [1] to [5], further containing at least one selected from the group consisting of an alkali metal sulfate, an alkaline earth metal sulfate, and an aluminum sulfate.
[7] The powdered quick-setting agent according to [5] or [6], wherein the alum is at least one selected from the group consisting of potassium alum, sodium alum, and ammonium alum.
[8] The powdered quick-setting agent according to any of [1] to [7], containing the calcium aluminate in an amount of 30 to 80 parts by mass and the sodium silicate in an amount of 0.5 to 20 parts by mass in 100 parts by mass of the powdered quick-setting agent.
[9] The powdered quick-setting agent according to any of [5] to [8], containing the alkali carbonate in an amount of 1 to 20 parts by mass, the calcium hydroxide in an amount of 5 to 30 parts by mass and the alum in an amount of 0.5 to 30 parts by mass in 100 parts by mass of the powdered quick-setting agent.
[10] The powdered quick-setting agent according to any of [6] to [9], containing the alkali metal sulfate in an amount of 3 to 25 parts by mass in 100 parts by mass of the powdered quick-setting agent.
[11] The powdered quick-setting agent according to any of [6] to [9], containing the alkaline earth metal sulfate in an amount of 10 to 60 parts by mass in 100 parts by mass of the powdered quick-setting agent.

[12] The powdered quick-setting agent according to any of [6] to [9], containing the aluminum sulfate in an amount of 5 to 25 parts by mass in 100 parts by mass of the powdered quick-setting agent.

[13] The powdered quick-setting agent according to any of [6] to [9] and [12], wherein the number of hydrates in the aluminum sulfate is 5 to 18.

[14] The powdered quick-setting agent according to any of [6] to [13], wherein the Blaine's specific surface area of the alkaline earth metal sulfate is 3000 cm$^2$/g or more.

[15] A quick-setting material prepared by blending a powdered quick-setting agent of any of [1] to [14] in spray mortar or spray concrete.

[16] The quick-setting material according to [15], wherein the spray mortar or the spray concrete contains a blast furnace slag.

[17] A quick-setting material hardened product of a hardened product of a quick-setting material of [15] or [16], which is such that cracks existing in the surface thereof and having a maximum width of 0.1 mm are repaired 50% or more in a water contact environment for at least 6 months.

[18] A spraying method, including mixing and combining a spray mortar or a spray concrete while being conveyed, with a powdered quick-setting agent of any of [1] to [14] to be a combined stream, and spraying the resultant stream to a subject to be sprayed therewith.

<Second Aspect of Invention>

[2-1] A powdered quick-setting agent containing a calcium aluminate, a sodium silicate and an alkali metal sulfate.

[2-2] The powdered quick-setting agent according to [2-1], containing the alkali metal sulfate in an amount of 3 to 25 parts by mass in 100 parts by mass of the powdered quick-setting agent.

[2-3] The powdered quick-setting agent according to [2-1] or [2-2], wherein the molar ratio of SiO$_2$ to Na$_2$O in the sodium silicate (SiO$_2$/Na$_2$O) is 0.5 to 1.5.

[2-4] The powdered quick-setting agent according to any of [2-1] to [2-3], wherein the number of hydrates in the sodium silicate is 9 or less.

[2-5] The powdered quick-setting agent according to any of [2-1] to [2-4], wherein the molar ratio of CaO to Al$_2$O$_3$ in the calcium aluminate (CaO/Al$_2$O$_3$) is 2.0 to 3.0.

[2-6] The powdered quick-setting agent according to any of [2-1] to [2-5], further containing at least one selected from the group consisting of an alkali carbonate, a calcium hydroxide and an alum.

[2-7] The powdered quick-setting agent according to [2-6], wherein the alum is at least one selected from the group consisting of potassium alum, sodium alum, and ammonium alum.

[2-8] The powdered quick-setting agent according to any of [2-1] to [2-7], containing the calcium aluminate in an amount of 30 to 80 parts by mass and the sodium silicate in an amount of 0.5 to 20 parts by mass in 100 parts by mass of the powdered quick-setting agent.

[2-9] The powdered quick-setting agent according to any of [2-6] to [2-8], containing the alkali carbonate in an amount of 1 to 20 parts by mass, the calcium hydroxide in an amount of 5 to 30 parts by mass and the alum in an amount of 0.5 to 30 parts by mass in 100 parts by mass of the powdered quick-setting agent.

[2-10] The powdered quick-setting agent according to any of [2-6] to [2-9], wherein the alkali carbonate is at least one selected from the group consisting of sodium carbonate, sodium sesqui-carbonate, sodium bicarbonate, and potassium carbonate.

[2-11] A quick-setting material prepared by blending a powdered quick-setting agent of any of [2-1] to [2-10] in spray mortar or spray concrete.

[2-12] A quick-setting material hardened product of a hardened product of a quick-setting material of [2-11], which is such that cracks existing in the surface thereof and having a maximum width of 0.1 mm are repaired 50% or more in a water contact environment for at least 6 months.

<Third Aspect of Invention>

[3-1] A powdered quick-setting agent containing a calcium aluminate, a sodium silicate and an alkaline earth metal sulfate.

[3-2] The powdered quick-setting agent according to [3-1], containing the alkaline earth metal sulfate in an amount of 10 to 60 parts by mass in 100 parts by mass of the powdered quick-setting agent.

[3-3] The powdered quick-setting agent according to [3-1] or [3-2], wherein the molar ratio of SiO$_2$ to Na$_2$O in the sodium silicate (SiO$_2$/Na$_2$O) is 0.5 to 1.5.

[3-4] The powdered quick-setting agent according to any of [3-1] to [3-3], wherein the number of hydrates in the sodium silicate is 9 or less.

[3-5] The powdered quick-setting agent according to any of [3-1] to [3-4], wherein the molar ratio of CaO to Al$_2$O$_3$ in the calcium aluminate (CaO/Al$_2$O$_3$) is 2.0 to 3.0.

[3-6] The powdered quick-setting agent according to any of [3-1] to [3-5], further containing at least one selected from the group consisting of an alkali carbonate, a calcium hydroxide and an alum.

[3-7] The powdered quick-setting agent according to [3-6], wherein the alum is at least one selected from the group consisting of potassium alum, sodium alum, and ammonium alum.

[3-8] The powdered quick-setting agent according to any of [3-1] to [3-7], containing the calcium aluminate in an amount of 30 to 80 parts by mass and the sodium silicate in an amount of 0.5 to 20 parts by mass in 100 parts by mass of the powdered quick-setting agent.

[3-9] The powdered quick-setting agent according to any of [3-6] to [3-8], containing the alkali carbonate in an amount of 1 to 20 parts by mass, the calcium hydroxide in an amount of 5 to 30 parts by mass and the alum in an amount of 0.5 to 30 parts by mass in 100 parts by mass of the powdered quick-setting agent.

[3-10] The powdered quick-setting agent according to any of [3-6] to [3-9], wherein the alkali carbonate is at least one selected from the group consisting of sodium carbonate, sodium sesqui-carbonate, sodium bicarbonate, and potassium carbonate.

[3-11] A quick-setting material prepared by blending a powdered quick-setting agent of any of [3-1] to [3-10] in spray mortar or spray concrete.

[3-12] A quick-setting material hardened product of a hardened product of a quick-setting material of [3-11], which is such that cracks existing in the surface thereof and having a maximum width of 0.1 mm are repaired 50% or more in a water contact environment for at least 6 months.

<Fourth Aspect of Invention>

[4-1] A powdered quick-setting agent containing a calcium aluminate, a sodium silicate and an aluminum sulfate.

[4-2] The powdered quick-setting agent according to [4-1], containing the aluminum sulfate in an amount of 5 to 25 parts by mass in 100 parts by mass of the powdered quick-setting agent.

[4-3] The powdered quick-setting agent according to [4-1] or [4-2], wherein the molar ratio of SiO$_2$ to Na$_2$O in the sodium silicate (SiO$_2$/Na$_2$O) is 0.5 to 1.5.

[4-4] The powdered quick-setting agent according to any of [4-1] to [4-3], wherein the number of hydrates in the sodium silicate is 9 or less.

[4-5] The powdered quick-setting agent according to any of [4-1] to [4-4], wherein the molar ratio of CaO to $Al_2O_3$ in the calcium aluminate ($CaO/Al_2O_3$) is 2.0 to 3.0.

[4-6] The powdered quick-setting agent according to any of [4-1] to [4-5], further containing at least one selected from the group consisting of an alkali carbonate, a calcium hydroxide and an alum.

[4-7] The powdered quick-setting agent according to [4-6], wherein the alum is at least one selected from the group consisting of potassium alum, sodium alum, and ammonium alum.

[4-8] The powdered quick-setting agent according to any of [4-1] to [4-7], containing the calcium aluminate in an amount of 30 to 80 parts by mass and the sodium silicate in an amount of 0.5 to 20 parts by mass in 100 parts by mass of the powdered quick-setting agent.

[4-9] The powdered quick-setting agent according to any of [4-6] to [4-8], containing the alkali carbonate in an amount of 1 to 20 parts by mass, the calcium hydroxide in an amount of 5 to 30 parts by mass and the alum in an amount of 0.5 to 30 parts by mass in 100 parts by mass of the powdered quick-setting agent.

[4-10] The powdered quick-setting agent according to any of [4-6] to [4-9], wherein the alkali carbonate is at least one selected from the group consisting of sodium carbonate, sodium sesqui-carbonate, sodium bicarbonate, and potassium carbonate.

[4-11] A quick-setting material prepared by blending a powdered quick-setting agent of any of [4-1] to [4-10] in spray mortar or spray concrete.

[4-12] A quick-setting material hardened product of a hardened product of a quick-setting material of [4-11], which is such that cracks existing in the surface thereof and having a maximum width of 0.1 mm are repaired 50% or more in a water contact environment for at least 6 months.

Here, the powdered quick-setting agent in the present invention is defined to be one capable of imparting a quick-setting performance to cement paste, cement mortar and cement concrete. Quick-setting means that extreme hard-setting or flowability dissipation occurs more than immediately after addition of the quick setting agent.

Advantageous Effects of Invention

According to the present invention, there can be provided a powdered quick-setting agent which, when used as a quick-setting material, exhibits good adhesiveness (especially good adhesiveness even in a water contact environment) and can exert an excellent repairing effect for cracked sites.

In particular, according to the third aspect of the invention, the quick-setting material can have an improved initial and long-term strength expressing performance and can exert an excellent repairing effect for cracked sites.

DESCRIPTION OF EMBODIMENTS

Hereinunder embodiments of each aspect of the present invention (embodiments of the invention) are described in detail. Unless otherwise specifically indicated, part and % used in the present invention are by mass.

<First Aspect of Invention>
[1. Powdered Quick-Setting Agent]

The powdered quick-setting agent of this embodiment contains a calcium aluminate and a sodium silicate. When the agent is applied to a spring-fed area, the calcium aluminate therein mainly gives good adhesiveness and the sodium silicate therein exhibits an excellent repairing effect for cracked sites. In particular, it is considered that sodium silicate can react with water in a spring-fed area to form a gel that fills up cracked sites, and may again harden and, as a result, it is presumed that the above-mentioned repairing effect can be hereby exhibited.

Preferably, the powdered quick-setting agent further contains at least one selected from the group consisting of an alkali carbonate, a calcium hydroxide and an alum. Also preferably, the components constituting the powdered quick-setting agent are powdery. When powdery, the handleability of the agent containing them improves.

(Calcium Aluminate)

Calcium aluminate (hereinafter referred to as CA) is a general term for compounds containing CaO and $Al_2O_3$ as main ingredients and having a hydrating activity, and includes compounds in which a part of CaO and/or $Al_2O_3$ are substituted with any of an alkali metal oxide, an alkaline earth metal oxide, a silicon oxide, a titanium oxide, an iron oxide, an alkali metal halide, an alkaline earth metal halide, an alkali metal sulfate and an alkaline earth metal sulfate, or substances with a small amount of such components solid-solutionized in those containing CaO and $Al_2O_3$ as main ingredients, and CA may be any crystalline or amorphous form.

Specific examples of crystalline compounds include, when CaO is represented by C, $Al_2O_3$ is by A, and $R_2O$ ($Na_2O$, $K_2O$, $Li_2O$) is by R, $C_3A$ and $C_{14}RA_5$ with an alkali metal solid-solutionized therein, as well as CA, $C_{12}A_7$, $C_{11}A_7 \cdot CaF_2$, $C_4A \cdot Fe_2O_3$, and $C_3A_3 \cdot CaSO_4$. As good in quick-setting performance, amorphous calcium aluminates are preferred.

Regarding the calcium aluminates for use in this embodiments, industrial materials thereof may be contaminated with minor alkali metals and/or alkaline earth metals, and CA materials containing such alkali metals and/or alkaline earth metals may partly form, but the present invention is not whatsoever restricted by the presence of such minor alkali metals and/or alkaline earth metals.

The molar ratio of $CaO/Al_2O_3$ in the calcium aluminates is not specifically limited, but in consideration of strength expressibility in an extremely early stage, the molar ratio is preferably 2.0 to 3.0.

When the molar ratio is 2.0 or more, setting properties in an extremely early stage can be bettered, and when the ratio is 3.0 or less, good long-term strength expressibility can be readily attained.

The content of the calcium aluminate in the powdered quick-setting agent of this embodiment is preferably 30 to 80 parts in 100 parts of the powdered quick-setting agent, more preferably 45 to 60 parts. When the content is 30 parts or more, good setting properties can be readily attained, and when the content is 80 parts or less, good long-term strength expressibility can be readily attained.

The Blaine's specific surface area (hereinafter this may be simply referred to as "Blaine") of the calcium aluminate is preferably 4000 to 8000 $cm^2/g$, more preferably 5000 to 7000 $cm^2/g$. When the Blaine's specific surface area is 4000 to 8000 $cm^2/g$, initial strength expressibility can be readily attained and handleability of mortar and/or concrete in spraying treatment can be thereby bettered.

The Blaine's specific surface area is measured based on the specific surface area test described in JIS R 5201 "Physical Test Method for Cement".

(Sodium Silicate)

Sodium silicate in the powdered quick-setting agent exhibits mainly an effect of accelerating flowability dissipation in an extremely early stage for cement mortar for spray mortar (hereinafter this may be simply referred to as "cement mortar") or for cement concrete for spray cement (hereinafter this may be simply referred to as "cement concrete"). In addition, for example, in the case where the quick-setting material that was sprayed using the powdered quick-setting agent has cracked after a long period of time, and for example, for cracks of 0.1 mm long, such cracks can be repaired in so far as under a running water condition. With that, sodium silicate having gelled with water can be considered to act to repair the cracks themselves to thereby narrow the width of the cracks.

From the viewpoint of efficiently expressing the above-mentioned effect, sodium silicate is preferably powdery.

As the powdered quick-setting agent, for example, for accelerating flowability dissipation in an extremely early stage, the molar ratio of $SiO_2$ to $Na_2O$ in the sodium silicate ($SiO_2/Na_2O$) is preferably 0.5 to 5, more preferably 0.5 to 1.5, even more preferably 0.9 to 1.3.

When the molar ratio is 0.5 or more, handleability as powder is good, and when the molar ratio is 1.5 or less, extreme flowability dissipation and initial strength expressibility from immediately after addition to cement mortar or cement concrete can be readily attained.

Sodium silicate includes sodium orthosilicate, sodium metasilicate and sodium sesqui-silicate, and above all, sodium metasilicate is preferred. Sodium metasilicate includes sodium silicate No. 1 [$Na_2Si_2O_5(Na_2O.2\ SiO_2$: n=2)], sodium silicate No. 2 [$Na_4Si_5O_{12}(Na_2O.2.5\ SiO_2$: n=2.5)], sodium silicate No. 3 [$Na_2Si_3O_7\ (Na_2O.3\ SiO_2$: n=3)], and sodium silicate No. 4 [$Na_2Si_4O_9(Na_2O.4SiO_2$: n=4)].

Sodium silicate may be hydrated or anhydrous with no specific limitation, but the number of hydrates therein is preferably 9 or less, more preferably 5 or less, and use of anhydride is even more preferred.

The Blaine's specific surface area of sodium silicate is preferably 300 to 1000 $cm^2/g$, more preferably 500 to 800 $cm^2/g$. When the Blaine's specific surface area is 300 to 1000 $cm^2/g$, initial strength expressibility is readily attained and handleability of mortar and/or concrete in spraying treatment can be bettered.

The content of the sodium silicate in the powdered quick-setting agent of this embodiment is preferably 0.5 to 20 parts in 100 parts of the powdered quick-setting agent, more preferably 1 to 10 parts. When the content is 0.5 to 20 parts, self-repairing function to cracking can be bettered more.

(Alkali Carbonate)

Alkali carbonate indicates an alkali metal carbonate, and can extremely improve the setting property and the initial strength expressibility of the powdered quick-setting agent. Though not specifically limited thereto, examples of the alkali carbonate include lithium carbonate, sodium carbonate, sodium sesqui-carbonate, potassium carbonate, sodium bicarbonate, and sodium hydrogencarbonate. In particular, sodium carbonate, potassium carbonate, sodium sesqui-carbonate, sodium bicarbonate and sodium hydrogencarbonate are especially effective for setting and initial strength expressibility, and one or more of these may be combined for use herein. At least one selected from the group consisting of sodium carbonate, sodium sesqui-carbonate, sodium bicarbonate and potassium carbonate is preferred. The content of the alkali carbonate is preferably 1 to 20 parts in 100 parts of the powdered quick-setting agent, more preferably 5 to 10 parts. When the content is 1 part or more, the effect of improving setting and initial strength can be readily attained, and when the content is 20 parts or less, quick-setting properties can be kept good.

The Blaine's specific surface area of the alkali carbonate is preferably 500 to 2000 $cm^2/g$, more preferably 800 to 1500 $cm^2/g$. When the Blaine's specific surface area is 500 to 2000 $cm^2/g$, initial strength expressibility can be readily attained, and handleability of mortar and/or concrete in spraying treatment can be bettered.

(Calcium Hydroxide)

Calcium hydroxide is a material effective for securing flowability dissipation and long-term strength expressibility in an extremely early stage. Though not specifically limited thereto, calcium hydroxide includes hydrated lime to form in hydration of quicklime, and carbide residue to form in hydration of carbide. Commercially-available calcium hydroxide is also usable here, and combined use is also possible. The content of the calcium hydroxide is preferably 5 to 30 parts in 100 parts of the powdered quick-setting agent, more preferably 10 to 25 parts. When the content is 5 parts or more, quick-setting properties and long-term strength expressibility can be secured. When the content is 20 parts or less, good initial strength expressibility can be readily attained.

The Blaine's specific surface area of the calcium hydroxide is preferably 1000 to 3000 $cm^2/g$, more preferably 1500 to 2500 $cm^2/g$. When the Blaine's specific surface area is 1000 to 3000 $cm^2/g$, quick-setting properties and long-term strength expressibility can be secured, and good initial strength expressibility can be readily attained.

(Alum)

Alum is effective for accelerating flowability dissipation immediately after blending with mortar cement or cement concrete and for accelerating strength expressibility for 1 day or so. Though not specifically limited thereto, examples of alum include potassium alum, chromium alum, iron alum, ammonium alum, sodium alum and natural alum, and any of these can be used either singly or as combined. In particular, for dissipating flowability of cement mortar or cement concrete, preferably, at least one selected from the group consisting of potassium alum, sodium alum and ammonium alum is contained.

The content of the alum is preferably 0.5 to 30 parts in 100 parts of the powdered quick-setting agent, more preferably 5 to 20 parts. When the content is 0.5 to 30 parts, flowability dissipation is not delayed, and strength expressibility in a material age of 1 day can be bettered.

The Blaine's specific surface area of alum is preferably 400 to 1000 $cm^2/g$, more preferably 600 to 800 $cm^2/g$. When the Blaine's specific surface area is 400 to 1000 $cm^2/g$, quick-setting properties and long-term strength expressibility can be secured, and good initial strength expressibility can be readily attained.

<Second Aspect of Invention>

[1. Powdered Quick-Setting Agent]

The powdered quick-setting agent of this embodiment contains a calcium aluminate, a sodium silicate and an alkali metal sulfate. When the agent is applied to a spring-fed area, the calcium aluminate therein mainly gives good adhesiveness and the sodium silicate therein exhibits an excellent repairing effect for cracked sites. In particular, it is presumed that, when sodium silicate is brought into contact with water in a spring-fed area, a gel substance of calcium silicate may be formed to fill up cracked sites, and as a result, the above-mentioned repairing action can be exhibited.

In addition, owing to good adhesiveness with calcium aluminate, alkali metal sulfate can efficiently exist in adhering parts. As a result, the effect of the alkali metal sulfate for enhancing strength in a relatively early stage, for example, strength after 24 hours can be readily attained.

Preferably, the powdered quick-setting agent further contains at least one selected from the group consisting of an alkali carbonate, a calcium hydroxide and an alum. Also preferably, the components contained in the powdered quick-setting agent are powdery. When powdery, the handleability of the components improves.

(Calcium Aluminate)

The calcium aluminate is the same as that in the first aspect of the invention.

(Sodium Silicate)

The sodium silicate is the same as that in the first aspect of the invention.

(Alkali Metal Sulfate)

An alkali metal sulfate is effective for imparting an effect of enhancing compression strength mainly up to 24 hours to cement mortar and cement concrete.

The alkali metal sulfate include lithium, sodium or potassium sulfates, and among them, lithium or sodium sulfates (lithium sulfate, sodium sulfate) are preferred for the strength enhancing effect. Also among them, sodium sulfate anhydride plays a role as a drying agent for absorbing moisture in air, and is therefore preferred as contributing toward stability during storage.

The Blaine's specific surface area of the alkali metal sulfate is preferably 100 to 1000 cm$^2$/g, more preferably 300 to 800 cm$^2$/g. When the Blaine's specific surface area is 100 to 1000 cm$^2$/g, strength expressibility up to 24 hours can be readily attained and handleability of mortar and/or concrete in spraying treatment can be thereby bettered.

Preferably, the alkali metal sulfate is contained in an amount of 3 to 25 parts in 100 parts of the powdered quick-setting agent, more preferably 5 to 15 parts. When the content is 3 to 25 parts, an effect of enhancing compression strength up to 24 hours can be more readily imparted.

(Alkali Carbonate)

The alkali carbonate is the same as that in the first aspect of the invention.

(Calcium Hydroxide)

The calcium hydroxide is the same as that in the first aspect of the invention.

(Alum)

The alum is the same as that in the first aspect of the invention.

<Third Aspect of Invention>

[Powdered Quick-Setting Agent]

The powdered quick-setting agent of this embodiment contains a calcium aluminate, a sodium silicate and an alkaline earth metal sulfate. When the agent is applied to a spring-fed area, the calcium aluminate therein mainly gives good adhesiveness and the sodium silicate therein exhibits an excellent repairing effect for cracked sites. In particular, it is presumed that, when sodium silicate is brought into contact with water in a spring-fed area, a gel substance of calcium silicate may be formed to fill up cracked sites, and as a result, the above-mentioned repairing action can be exhibited.

In addition, the alkaline earth metal sulfate can provide an effect of enhancing strength for a relatively long period of time. In particular, at high temperatures of 35° C. or higher, long-term strength can be increased more than in a case not containing an alkaline earth metal sulfate. This may be presumed because of increase in the ettringite amount by the alkaline earth metal sulfate.

Preferably, the powdered quick-setting agent further contains at least one selected from the group consisting of an alkali carbonate, a calcium hydroxide and an alum. Also preferably, the components contained in the powdered quick-setting agent are powdery. When powdery, the handleability of the components improves.

(Calcium Aluminate)

The calcium aluminate is the same as that in the first aspect of the invention.

(Sodium Silicate)

The sodium silicate is the same as that in the first aspect of the invention.

(Alkaline Earth Metal Sulfate)

An alkaline earth metal sulfate imparts an effect of enhancing compression strength for a short period of time to a long period time (for example, for a material age of 28 days) to cement mortar or cement concrete.

The alkaline earth metal sulfate includes calcium and magnesium sulfates, and among these, a sulfate of calcium (calcium sulfate) is preferred as the effect of strength enhancement.

Depending on presence or absence of crystal water, the calcium sulfate includes an anhydride, a hemihydrate and a dihydrate, and any of these is usable here.

The Blaine's specific surface area of the alkaline earth metal sulfate is preferably 1000 cm$^2$/g or more, more preferably 2000 cm$^2$/g or more, even more preferably 3000 cm$^2$/g or more. When the Blaine's specific surface area is 1000 cm$^2$/g, or more, strength expressibility in a short period of time to a long period of time can be readily attained and handleability of mortar and/or concrete in spraying treatment can be thereby bettered. The Blaine's specific surface area is preferably 6000 cm$^2$/g or less, more preferably 5000 cm$^2$/g or less.

Preferably, the alkaline earth metal sulfate is contained in an amount of 10 to 60 parts in 100 parts of the powdered quick-setting agent, more preferably 15 to 60 parts, even more preferably 15 to 50 parts, and especially more preferably 20 to 50 parts. When the content is 10 to 60 parts, the effect of enhancing long-term strength can be more readily imparted.

(Alkali Carbonate)

The alkali carbonate is the same as that in the first aspect of the invention.

(Calcium Hydroxide)

The calcium hydroxide is the same as that in the first aspect of the invention.

(Alum)

The alum is the same as that in the first aspect of the invention.

[Fourth Aspect of Invention]

[1. Powdered Quick-Setting Agent]

The powdered quick-setting agent of this embodiment contains a calcium aluminate, a sodium silicate and an aluminum sulfate. When the agent is applied to a spring-fed area, the calcium aluminate therein mainly gives good adhesiveness and the sodium silicate therein exhibits an excellent repairing effect for cracked sites. In particular, it is presumed that sodium silicate may react with water in a spring-fed area to gel to thereby fill up cracked sites, and may again harden and, as a result, the above-mentioned repairing action can be thereby exhibited.

In addition, aluminum sulfate in this embodiment is a component to accelerate initial setting to thereby reduce a rebound ratio, and this supplies an aluminum ion in a process of hydration of cement to react with a calcium ion from cement or calcium aluminates to form a calcium aluminate hydrate, and further reacts with a sulfate ion to form a calcium sulfoaluminate in an early stage to thereby contribute toward improving initial strength expressibility. It is presumed that such effects could be exhibited to a maximum extent by coexistence of a calcium aluminate to exhibit adhesiveness and a sodium silicate to exhibit a gelling action.

Preferably, the powdered quick-setting agent further contains at least one selected from the group consisting of an alkali carbonate, a calcium hydroxide and an alum. Also preferably, the components contained in the powdered quick-setting agent are powdery. When powdery, the handleability of the components improves.

(Calcium Aluminate)

The calcium aluminate is the same as that in the first aspect of the invention.

(Sodium Silicate)

The sodium silicate is the same as that in the first aspect of the invention.

(Aluminum Sulfate)

Aluminum sulfate imparts an effect of mainly accelerating setting speed (initial setting) to thereby reduce a rebound ratio, to cement mortar and cement concrete.

Aluminum sulfate has a chemical formula of $Al_2(SO_4)_3 \cdot nH_2O$, and $Al_2(SO_4)_3 \cdot 14$ to $18H_2O$, $Al_2(SO_4)_3 \cdot 8H_2O$, and aluminum sulfate anhydride are usable, but not limited thereto, any commercially-available ones are also usable. Specifically, $Al_2(SO_4)_3 \cdot 14$ to $18H_2O$, $Al_2(SO_4)_3 \cdot 8H_2O$, and aluminum sulfate anhydride are usable.

Preferably, the aluminum sulfate is contained in an amount of 5 to 25 parts in 100 parts of the powdered quick-setting agent, more preferably 7.5 to 20 parts. When the content is 5 to 25 parts, the effect of accelerating setting speed and the effect of reducing a rebound ratio can be more readily imparted.

Also preferably, the aluminium sulfate is a fine powder. Specifically, a fine powder capable of passing through a sieve of 1.2 mm in a ratio of 90% or more is preferred, and a fine powder capable of passing through a sieve of 0.6 mm in a ratio of 90% or more is more preferred.

An aluminum sulfate anhydride may have a low dissolution speed, and therefore could hardly have a sufficient effect of improving setting properties. Consequently, a hydrate salt is preferably used.

(Alkali Carbonate)

The alkali carbonate is the same as that in the first aspect of the invention.

(Calcium Hydroxide)

The calcium hydroxide is the same as that in the first aspect of the invention.

(Alum)

The alum is the same as that in the first aspect of the invention.

[2. Quick-Setting Material]

The quick-setting material of this embodiment is prepared by blending the powdered quick-setting agent of the present invention in spray mortar or spray concrete.

Cement for use in the spray mortar or spray concrete includes various types of Portland cement such as normal cement, early strength cement, ultra-high-early-strength cement, low-heat cement and moderate-heat cement; various types of mixed cement prepared by mixing any of blast furnace slag, fly ash or silica in such Portland cement; various types of filler cement prepared by mixing any of limestone powder or blast furnace slowly cooled slag fine powder in such cement, as well as various types of ecological cement (eco-cement) produced from city refuse incineration ash or sewage sludge incineration ash as a starting material.

Depending on the purpose, mortar (spray mortar) or concrete (spray concrete) preferably contains blast furnace slag. Preferably, the content of blast furnace slag is 15 to 85 parts relative to 100 parts of the total of cement and blast furnace slag, more preferably 10 to 80 parts.

Though not specifically limited, the aggregate for use in spray mortar or spray concrete is preferably one having a low water absorption rate and having a high aggregate strength. The maximum dimension of the aggregate is not specifically limited so far as acceptable for spraying treatment. Fine aggregate such as river sand, mountain sand, sea sand, lime sand and silica sand is usable, coarse aggregate such as river pebbles, mountain pebbles and lime pebbles is usable, and crushed sand and crushed stones are also usable.

The amount of the powdered quick-setting agent to be used is preferably 5 to 20 parts relative to 100 parts of cement in spray mortar or spray concrete, more preferably 7 to 15 parts. When the amount of the powdered quick-setting agent used is 5 to 20 parts, good adhesiveness can be attained even in a water contact environment such as a spring-fed area, and an excellent repairing action can be readily exhibited on cracked sites. Also preferably, water/cement ratio is 40 to 65%.

The quick-setting material of this embodiment is used mainly in a spraying method, though not limited thereto. The spraying method is preferably dry spraying or wet spraying, depending on the desired physical properties, economical efficiency and workability.

[3. Quick-Setting Material Hardened Product]

The quick-setting material hardened product of this embodiment is a hardened product of the previously-mentioned quick-setting material of the present invention, and is such that cracks existing in the surface thereof and having a maximum width of 0.1 mm are repaired 50% or more in a water contact environment for at least 6 months. Here, "repaired 50% or more" means that a half or more of the projected area of cracks having a maximum width of 0.1 mm are filled up.

As previously described, the quick-setting material of this embodiment is highly adhesive and therefore can efficiently give a hardened product. A hardened product of an ordinary spraying material may often crack with age. As the case may be, the quick-setting material hardened product of this embodiment may form fine cracks, but it is considered that sodium silicate in the quick-setting material can react with water to gel in a water contact environment such as a spring-fed area to thereby full up the cracks, and may then again harden. Consequently, the quick-setting material hardened product can exhibit an excellent repairing effect for cracks and can secure good durability.

Regarding the quick-setting material of the second aspect of the invention, the alkali metal sulfate therein can efficiently exist in the applied area, and therefore a strength enhancing effect in a relatively early stage can be readily realized owing to the alkali metal sulfate.

Regarding the quick-setting material of the third aspect of the invention, the alkaline earth metal sulfate therein can efficiently exist in the applied area, and therefore a strength enhancing effect for a relatively long period of time can be readily realized owing to the alkaline earth metal sulfate. In particular, even at high temperatures of 35° C. or higher, a long-term strength enhancing effect can be readily attained.

Regarding the quick-setting material of the fourth aspect of the invention, the aluminum sulfate therein can efficiently exist in the applied area, and therefore a setting speed enhancing effect and a rebound rate reducing effect can be readily realized owing to the aluminum sulfate.

[4. Spraying Method]

The spraying method of this embodiment is a method of mixing and combining a spray mortar or a spray concrete in conveyance with the powdered quick-setting agent of the present invention and spraying the resultant mixture to a subject to be sprayed therewith. By mixing and combining with the powdered quick-setting agent, the quick-setting material of the present invention previously mentioned is formed.

Specifically, spray concrete or spray mortar that is being quantitatively conveyed via a concrete pump or a mortar pump is further conveyed on the way with compressed air and/or pumping to a quick-setting agent mixing zone. In that zone, the thus-conveyed spray concrete or spray mortar is mixed to be a merged stream with the powdered quick-setting agent of the present invention that is being quantitatively conveyed from a quick-setting gent adding machine by the action of a compressed air for conveyance, and then sprayed to a subject to be sprayed therewith.

In such a spraying method, the quick-setting agent adding machine is preferably so constructed that a quick-setting agent is first added thereto, then put into a tank, combined with a compressed air while being quantitatively fed via a rotary feed, and thereafter further conveyed by the action of compressed air, in that order from the upstream side of the machine.

The power of the rotary feeder of the quick-setting agent machine is preferably signaled by the power of the piston of the concrete pump.

Also preferably, before the quick-setting agent adding machine, a quick-setting agent supplier is arranged so that the quick-setting agent can be supplied to the quick-setting agent adding machine after quantitatively conveyed from the quick-setting agent supplier.

Further, it is also preferable that the quick-setting agent supplier can coordinate with a leveling meter of the tank of the quick-setting agent adding machine so as to be signaled and outputted therewith.

Examples of the spraying system include, though not specifically limited thereto, a concrete pump by MAYCO Industries Inc. as a concrete conveyer, a device by Werner Mader GmbH as a quick-setting agent adding device, a device by Spiroflow Limited as a quick-setting agent supplier to the adding device, and other devices where a series of movements of the individual devices are made to coordinate with each other.

EXAMPLES

Hereinunder the contents of the present invention are described in further detail with reference to Examples and Comparative Examples given below, but the present invention is not limited to these.

Examples of First Aspect of Invention

Experimental Example 1

Alkali carbonate A, calcium aluminate, calcium hydroxide α, alum a and sodium silicate were mixed according to the blending formulation shown in Table 1 and Table 2 to prepare a powdered quick-setting agent, while on the other hand, mortar composed of 800 g of cement 2000 g of fine aggregate, 400 g of water was prepared, and 80 g of the powdered quick-setting agent was added to the mortar to prepare quick-setting mortar (quick-setting material), and immediately after preparation, the flowability reduction time, the setting time and the compression strength of the material were measured. The results are shown in Table 1 and Table 2.

The materials used and the test methods are described below.

"Materials Used"

Cement: commercial product, normal Portland cement, density 3.15 g/cm$^3$

Fine aggregate: river sand from Himekawa river system of Niigata prefecture, density 2.61 g/cm$^3$ Water: industrial water Alkali carbonate A: commercial product, sodium carbonate, Blaine 1200 cm$^2$/g Calcium aluminate: Raw materials were crushed and mixed so as to have a molar ratio CaO/Al$_2$O$_3$ of 2.5, then melted in an electric furnace and rapidly cooled.

Degree of vitrification 90%, Blaine 5500 cm$^2$/g

Calcium hydroxide α: carbide residue, Blaine 2000 cm$^2$/g

Alum a: potassium alum 12-hydrate, commercial product, Blaine 600 cm$^2$/g

Sodium silicate: SiO$_2$/Na$_2$O molar ratio 1.0, Blaine 600 cm$^2$/g, commercial product, anhydride "Test Methods"

Flowability Reduction Time:

A powdered quick-setting agent was added to the prepared mortar, and the time for mortar flowability reduction was measured.

Setting Time:

A powdered quick-setting agent was added to the prepared mortar, then quickly packed in a formwork exclusive for proctor test, and the start time for setting and the end time of setting after addition of the powdered quick-setting agent were measured (according to ASTM C403).

Compression Strength:

Like that for measurement of the setting time, the compression strength (N/mm$^2$) after preparation of the quick-setting mortar was measured. The material age was 1 day and 28 days (according to JSCE D102).

TABLE 1

| | Formulation of Powdered Quick-Setting Agent (part) | | | | | Flowability Reduction Time (sec) | Setting Time (min) | | Compression Strength (N/mm$^2$) | | |
|---|---|---|---|---|---|---|---|---|---|---|---|
| Test No. | Alkali Carbonate A | Calcium Aluminate | Calcium Hydroxide α | Alum a | Sodium Silicate | | Start | End | 1 day | 28 days | Remarks |
| 1-1 | 0 | 50 | 20 | 10 | 5 | 2 | 0.5 | 3 | 3.3 | 33.5 | Example |
| 1-2 | 1 | 50 | 20 | 10 | 5 | 2 | 0.75 | 3 | 6.1 | 32.5 | Example |

TABLE 1-continued

| Test No. | Formulation of Powdered Quick-Setting Agent (part) | | | | | Flowability Reduction Time (sec) | Setting Time (min) | | Compression Strength (N/mm²) | | Remarks |
|---|---|---|---|---|---|---|---|---|---|---|---|
| | Alkali Carbonate A | Calcium Aluminate | Calcium Hydroxide α | Alum a | Sodium Silicate | | Start | End | 1 day | 28 days | |
| 1-3 | 3 | 50 | 20 | 10 | 5 | 2 | 0.75 | 3 | 7.5 | 32.5 | Example |
| 1-4 | 5 | 50 | 20 | 10 | 5 | 2 | 0.75 | 3 | 10.2 | 32.0 | Example |
| 1-5 | 10 | 50 | 20 | 10 | 5 | 3 | 0.75 | 4 | 12.1 | 32.0 | Example |
| 1-6 | 20 | 50 | 20 | 10 | 5 | 3 | 0.75 | 4 | 13.1 | 32.0 | Example |
| 1-7 | 25 | 50 | 20 | 10 | 5 | 10 | 1 | 7 | 14.1 | 28.5 | Example |
| 1-8 | 10 | 0 | 20 | 10 | 5 | 5 | 30 | 180 | 7.5 | 24.0 | Comparative Example |
| 1-9 | 10 | 25 | 20 | 10 | 5 | 5 | 3 | 30 | 8.1 | 35.0 | Example |
| 1-10 | 10 | 30 | 20 | 10 | 5 | 5 | 2 | 15 | 10.0 | 34.0 | Example |
| 1-11 | 10 | 40 | 20 | 10 | 5 | 2 | 1 | 7 | 11.5 | 33.0 | Example |
| 1-5 | 10 | 50 | 20 | 10 | 5 | 3 | 0.75 | 4 | 12.1 | 32.0 | Example |
| 1-12 | 10 | 70 | 20 | 10 | 5 | 2 | 0.5 | 2 | 11.0 | 30.0 | Example |
| 1-13 | 10 | 75 | 20 | 10 | 5 | 1 | 0.5 | 1 | 8.5 | 28.0 | Example |
| 1-14 | 10 | 50 | 0 | 10 | 5 | 5 | 0.75 | 5 | 10.5 | 22.0 | Example |
| 1-15 | 10 | 50 | 5 | 10 | 5 | 2 | 0.75 | 4 | 11.1 | 29.0 | Example |
| 1-16 | 10 | 50 | 10 | 10 | 5 | 2 | 0.75 | 4 | 11.6 | 31.0 | Example |
| 1-5 | 10 | 50 | 20 | 10 | 5 | 3 | 0.75 | 4 | 12.1 | 32.0 | Example |
| 1-17 | 10 | 50 | 25 | 10 | 5 | 3 | 0.75 | 3 | 10.0 | 32.0 | Example |
| 1-18 | 10 | 50 | 35 | 10 | 5 | 3 | 0.75 | 3 | 8.0 | 31.0 | Example |

TABLE 2

| Test No. | Formulation of Powdered Quick-Setting Agent (part) | | | | | Flow ability Reduction Time (sec) | Setting Time (min) | | Compression Strength (N/mm²) | | Remarks |
|---|---|---|---|---|---|---|---|---|---|---|---|
| | Alkali Carbonate A | Calcium Aluminate | Calcium Hydroxide α | Alum a | Sodium Silicate | | Start | End | 1 day | 28 days | |
| 1-19 | 10 | 50 | 20 | 0 | 5 | 7 | 0.5 | 3 | 5.1 | 25.0 | Example |
| 1-20 | 10 | 50 | 20 | 0.5 | 5 | 5 | 0.5 | 3 | 10.1 | 27.0 | Example |
| 1-21 | 10 | 50 | 20 | 5 | 5 | 3 | 0.75 | 4 | 11.5 | 30.0 | Example |
| 1-5 | 10 | 50 | 20 | 10 | 5 | 3 | 0.75 | 4 | 12.1 | 32.0 | Example |
| 1-22 | 10 | 50 | 20 | 20 | 5 | 2 | 0.75 | 4 | 12.5 | 32.0 | Example |
| 1-23 | 10 | 50 | 20 | 25 | 5 | 2 | 0.75 | 4 | 12.5 | 31.0 | Example |
| 1-24 | 10 | 50 | 20 | 10 | 0 | 45 | 1 | 4 | 12.5 | 32.0 | Comparative Example |
| 1-25 | 10 | 50 | 20 | 10 | 0.5 | 20 | 0.75 | 15 | 12.6 | 32.0 | Example |
| 1-26 | 10 | 50 | 20 | 10 | 1 | 15 | 0.75 | 4 | 12.3 | 32.0 | Example |
| 1-5 | 10 | 50 | 20 | 10 | 5 | 3 | 0.75 | 4 | 12.1 | 32.0 | Example |
| 1-27 | 10 | 50 | 20 | 10 | 10 | 3 | 0.75 | 3 | 11.2 | 31.0 | Example |
| 1-28 | 10 | 50 | 20 | 10 | 20 | 2 | 0.5 | 3 | 10.8 | 30.0 | Example |
| 1-29 | 10 | 50 | 20 | 10 | 25 | 1 | 0.5 | 3 | 5.5 | 22.0 | Example |
| 1-30 | — | 80 | — | — | 20 | 5 | 0.75 | 7 | 7.7 | 29.0 | Example |

From Table 1 and Table 2, it can be seen that, by containing a calcium aluminate and a sodium silicate and preferably further containing, in addition thereto, a calcium hydroxide, an alum and an alkali carbonate, the flowability reduction time was short, the setting time was not delayed and the compression strength was good. In particular, when an alum and a sodium silicate are contained, flowability reduction is prevented from being delayed and the mixtures well functioned as a quick-setting agent. It can be seen that the content of each component has its own appropriate level.

Experimental Example 2

The same tests as in Experimental Example 1 were carried out except that sodium silicates having a different molar ratio $SiO_2/Na_2O$ were used as in Table 3. The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 3 below.

TABLE 3

| Test No. | Sodium Silicate $SiO_2/Na_2O$ molar ratio | Flow-ability Reduction Time (sec) | Setting Time (min) | | Compression Strength (N/mm²) | | Remarks |
|---|---|---|---|---|---|---|---|
| | | | Start | End | 1 day | 28 days | |
| 2-1 | 0.45 | 2 | 0.75 | 3 | 5.1 | 22.5 | Example |
| 2-2 | 0.5 | 2 | 0.75 | 3 | 11.5 | 32.5 | Example |
| 2-3 | 0.67 | 2 | 0.75 | 3 | 11.2 | 32.0 | Example |
| 2-4 | 0.9 | 3 | 0.75 | 4 | 12.2 | 32.1 | Example |

TABLE 3-continued

| Test No. | Sodium Silicate SiO$_2$/Na$_2$O molar ratio | Flow-ability Reduction Time (sec) | Setting Time (min) Start | Setting Time (min) End | Compression Strength (N/mm$^2$) 1 day | Compression Strength (N/mm$^2$) 28 days | Remarks |
|---|---|---|---|---|---|---|---|
| 1-5 | 1.0 | 3 | 0.75 | 4 | 12.1 | 32.0 | Example |
| 2-5 | 1.3 | 3 | 0.75 | 4 | 12.2 | 32.0 | Example |
| 2-6 | 1.5 | 3 | 0.75 | 4 | 13.1 | 28.5 | Example |
| 2-7 | 2.0 | 10 | 2 | 7 | 6.0 | 22.0 | Example |

From Table 3, it can be seen that, by containing a calcium aluminate and a sodium silicate, the flowability reduction time was short, the setting time was not delayed and the compression strength was good. It is further known that the molar ratio of SiO$_2$/Na$_2$O of sodium silicate has an appropriate numerical range for expressing better properties.

Experimental Example 3

The same tests as in Experimental Example 1 were carried out except that different kinds of sodium silicate hydrate as shown in Table 4 were used. The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 4.

TABLE 4

| Test No. | Sodium Silicate Hydrate | Flowability Reduction Time (sec) | Setting Time (min) Start | Setting Time (min) End | Compression Strength (N/mm$^2$) 1 day | Compression Strength (N/mm$^2$) 28 days | Remarks |
|---|---|---|---|---|---|---|---|
| 1-5 | Anhydride | 3 | 0.75 | 4 | 12.1 | 32.0 | Example |
| 3-1 | 5-Hydrate | 2 | 0.75 | 4 | 11.5 | 30.5 | Example |
| 3-2 | 9-Hydrate | 1 | 0.75 | 4 | 10.5 | 30.0 | Example |

From Table 4, it is considered that any type of sodium silicate hydrate is effective for a powdered quick-setting agent.

Experimental Example 4

The same tests as in Experimental Example 1 were carried out except that different kinds of alum as shown in Table 5 were used. The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 5.

"Materials Used"
Alum a: potassium alum 12-hydrate, commercial product, Blaine 600 cm$^2$/g
Alum b: sodium aluminum sulfate 12-hydrate, commercial product, Blaine 700 cm$^2$/g
Alum c: ammonium alum 12-hydrate, commercial product, Blaine 600 cm$^2$/g
Alum d: iron alum 12-hydrate, commercial product, Blaine 600 cm$^2$/g
Alum e: chromium alum 12-hydrate, commercial product, Blaine 600 cm$^2$/g
Alum f: potassium alum anhydride, commercial product, Blaine 600 cm$^2$/g
Alum g: ammonium alum anhydride, commercial product, Blaine 700 cm$^2$/g
Alum h: iron alum mono-hydrate, commercial product, Blaine 600 cm$^2$/g
Alum i: iron alum anhydride, commercial product, Blaine 700 cm$^2$/g

TABLE 5

| Test No. | Kind of Alum | Flowability Reduction Time (sec) | Setting Time (min) Start | Setting Time (min) End | Compression Strength (N/mm$^2$) 1 day | Compression Strength (N/mm$^2$) 28 days | Remarks |
|---|---|---|---|---|---|---|---|
| 1-5 | a | 3 | 0.75 | 4 | 12.1 | 32.0 | Example |
| 4-1 | b | 4 | 0.75 | 5 | 11.5 | 31.0 | Example |
| 4-2 | c | 3 | 0.75 | 4 | 8.6 | 30.0 | Example |
| 4-3 | d | 5 | 1 | 5 | 9.2 | 27.5 | Example |
| 4-4 | e | 15 | 3 | 10 | 7.5 | 25.0 | Example |
| 4-5 | f | 2 | 0.75 | 3 | 13.2 | 33.5 | Example |
| 4-6 | g | 2 | 0.75 | 3 | 10.1 | 26.5 | Example |
| 4-7 | h | 3 | 0.75 | 4 | 9.5 | 28.0 | Example |
| 4-8 | i | 3 | 0.75 | 4 | 10.0 | 29.0 | Example |

As in Table 5, the flowability reduction time was short, the setting time was not delayed and the compression strength was good irrespective of the type of alum. In addition, it can be seen that some types of alum are effective for expressing better properties.

Experimental Example 5

The same tests as in Experimental Example 1 were carried out except that different kinds of alkali carbonate as shown in Table 6 were used. The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 6.

"Materials Used"
Alkali carbonate A: commercial product, sodium carbonate, Blaine 1200 cm$^2$/g
Alkali carbonate B commercial product, sodium sesqui-carbonate, Blaine 1400 cm$^2$/g
Alkali carbonate C commercial product, sodium bicarbonate, Blaine 800 cm$^2$/g
Alkali carbonate D: commercial product, lithium carbonate, Blaine 1000 cm$^2$/g
Alkali carbonate E: commercial product, potassium carbonate, Blaine 1200 cm$^2$/g

TABLE 6

| Test No. | Kind of Alkali Carbonate | Flowability Reduction Time (sec) | Setting Time (min) | | Compression Strength (N/mm$^2$) | | Remarks |
|---|---|---|---|---|---|---|---|
| | | | Start | End | 1 day | 28 days | |
| 1-5 | A | 3 | 0.75 | 4 | 12.1 | 32.0 | Example |
| 5-1 | B | 5 | 0.75 | 6 | 10.8 | 33.0 | Example |
| 5-2 | C | 6 | 0.75 | 7 | 8.9 | 34.0 | Example |
| 5-3 | D | 20 | 1 | 20 | 6.5 | 29.5 | Example |
| 5-4 | E | 5 | 0.75 | 7 | 11.5 | 32.5 | Example |

As in Table 6, the flowability reduction time was short, the setting time was not delayed and the compression strength was good irrespective of the type of alkali carbonate. In addition, it can be seen that some types of alkali carbonate are effective for expressing better properties.

Experimental Example 6

The same tests as in Experimental Example 1 were carried out except that calcium aluminates having a different molar ratio CaO/Al$_2$O$_3$ as in Table 7 were used. The powdered quick-setting agent was formulated so as to have the formulation of Test No. 1-5. The calcium aluminates were prepared to have Blaine of 5500±200 cm$^2$/g/

80 g of the powdered quick-setting agent was added to mortar to prepare quick-setting mortar, and immediately after preparation, the flowability reduction time, the setting time and the compression strength thereof were measured. The results are shown in Table 7.

TABLE 7

| Test No. | Calcium Aluminate CaO/Al$_2$O$_3$ molar ratio | Flowability Reduction Time (sec) | Setting Time (min) | | Compression Strength (N/mm$^2$) | | Remarks |
|---|---|---|---|---|---|---|---|
| | | | Start | End | 1 day | 28 days | |
| 1-5 | 2.5 | 3 | 0.75 | 4 | 12.1 | 32.0 | Example |
| 6-1 | 1.9 | 10 | 2.0 | 7 | 13.5 | 33.0 | Example |
| 6-2 | 2.0 | 4 | 0.75 | 4 | 13.2 | 33.0 | Example |
| 6-3 | 2.6 | 2 | 0.75 | 4 | 12.6 | 31.5 | Example |
| 6-4 | 3.0 | 2 | 0.75 | 5 | 11.5 | 29.0 | Example |
| 6-5 | 3.1 | 6 | 5.0 | 30 | 8.2 | 27.5 | Example |

From the results in Table 7, when the molar ratio CaO/Al$_2$O$_3$ in calcium aluminates was 2.0 to 3.0, the flowability reduction time and the setting time were short and the compression strength was good.

Experimental Example 7

Concrete (spray concrete) of 360 kg of cement, 216 kg of water, 1049 kg of fine aggregate and 716 kg of coarse aggregate (No. 6 crushed stone from Himekawa river system of Niigata prefecture, density 2.67 g/cm$^3$) was prepared. The concrete was pumped at a rate of 5 m$^3$/h using a concrete pump from MAYCO Industries Inc. (Suprema), and on the way, mixed to be a merged stream with compressed air from a separate system, and pneumatically conveyed. Further, at a point of 3 m before ejection, a powdered quick-setting agent shown in Table 8 below as mixed to be a merged stream with the thus-pneumatically conveyed concrete using a conveyer system from Werner Mader Corporation (WM-14 FU) in such a manner that the agent could be 10 parts relative to 100 parts of the cement, thereby preparing a quick-setting material, which was then sprayed onto an iron plate through a nozzle tip. The initial strength, the long-term strength, the rebound ratio, and the crack repairing rate after spraying are shown in Table 8. For feeding the quick-setting agent to the quick-setting agent conveyer system, a device from Spiroflow Limited (FLEXIBLE SCREW CONVEYOR) was used, and all the devices were made to coordinate with each other under control by electric signals.

Comparative Example

The same concrete as in Experimental Example 7 was mixed to be a merged stream with an ordinary quick-setting agent, DENKA NATMIC TYPE-5 (quick-setting agent No. T-5) that had been pneumatically conveyed, in such a manner that the agent could be 10 parts (Test No. 7-15) relative to 100 parts of cement to prepare spray concrete, which was sprayed onto an iron plate through a nozzle tip. Also similarly, the quick-setting agent No. T-5 was mixed to be a merged stream with concrete that had been pneumatically conveyed in such a manner that the agent could be 7 parts (Test No. 7-16) relative to 100 parts of cement to prepare a quick-setting material, which was sprayed onto an iron plate through a nozzle tip. The initial strength, the long-term strength, the rebound ratio, and the crack repairing rate after spraying are shown in Table 8.

"Test Methods"

Initial Strength:

Sprayed onto a formwork according to JSCE-G561, the pull-out strength of the sample at a time of a material age of 10 minutes, 3 hours and 1 day was converted into a compression strength to determine the initial strength thereof.

Long-Term Strength:

Sprayed onto a formwork according to JSCE-F561, JIS A1107, a core of the sample was collected at a time of a material age of 7 days and 28 days, and the compression strength thereof was measured.

Rebound:

The rebound in spraying for 3 minutes to a simulated tunnel having an excavation cross-sectional surface of 15 m$^2$ was measured according to JSCE-F563, and the rebound ratio from the spray concrete used was determined according to the following expression.

Rebound Ratio=Amount of dropped spray concrete (kg)/amount of spray concrete used for spraying (kg)×100(%)   Expression)

The rebound ratio is preferably 20% or less.

Crack Repairing Rate:

Spray concrete was sprayed onto each of two formworks of 10 cm×10 cm×40 cm to prepare test bodies. Immediately after preparation, the two test bodies were fixed, as separated by a clearance of 0.1 mm therebetween in such a manner that the 40 cm surface could be in parallel to each other, and cured in water at 20° C. for 6 months, and the test bodies were observed with a microscope to determine the repairing rate for the clearance having a width of 0.1 mm.

The crack repairing rate is preferably 50% or more.

TABLE 8

| Test No. | Test No. of Powdered Quick-Setting Agent | Rebound (%) | Initial Strength (N/mm²) 10 min | 3 hrs | 1 day | Long-Term Strength (N/mm²) 7 days | 28 days | Crack Repairing Rate (%) | Remarks |
|---|---|---|---|---|---|---|---|---|---|
| 7-1 | 1-5 | 15 | 1.4 | 2.1 | 9.7 | 26.5 | 34.0 | 100 | Example |
| 7-2 | 1-1 | 19 | 0.4 | 1.1 | 4.1 | 27.2 | 35.0 | 100 | Example |
| 7-3 | 1-8 | 60 | 0 | 0.3 | 5.3 | 17.5 | 24.0 | 90 | Comparative Example |
| 7-4 | 1-24 | 80 | 1.5 | 1.8 | 8.2 | 18.2 | 25.5 | 20 | Comparative Example |
| 7-5 | 2-1 | 20 | 1.2 | 2.0 | 4.1 | 18.6 | 23.0 | 30 | Example |
| 7-6 | 2-5 | 17 | 1.5 | 2.0 | 9.5 | 25.3 | 31.5 | 100 | Example |
| 7-7 | 2-6 | 41 | 1.0 | 1.7 | 5.2 | 14.5 | 23.5 | 100 | Example |
| 7-8 | 3-2 | 16 | 1.3 | 2.0 | 8.9 | 25.0 | 32.0 | 50 | Example |
| 7-9 | 4-4 | 35 | 0.7 | 1.2 | 6.5 | 21.1 | 26.5 | 60 | Example |
| 7-10 | 5-2 | 20 | 1.2 | 1.7 | 7.5 | 28.5 | 35.0 | 70 | Example |
| 7-11 | 5-3 | 35 | 0.4 | 1.2 | 7.2 | 25.1 | 33.0 | 70 | Example |
| 7-12 | 6-1 | 29 | 1.1 | 1.3 | 8.9 | 24.5 | 32.5 | 70 | Example |
| 7-13 | 6-4 | 28 | 1.3 | 2.0 | 9.2 | 28.0 | 35.0 | 70 | Example |
| 7-14 | 6-5 | 17 | 0.3 | 1.0 | 6.8 | 22.5 | 29.5 | 70 | Example |
| 7-15 | T-5 10 pts | 22 | 1.1 | 1.9 | 9.5 | 25.6 | 33.0 | 10 | Comparative Example |
| 7-16 | T-5 7 pts | 25 | 0.6 | 1.5 | 8.9 | 25.1 | 30.0 | 45 | Comparative Example |
| 7-17 | 1-30 | 20 | 1.3 | 1.8 | 7.3 | 21.7 | 29.0 | 80 | Example |

As in Table 8, the samples of Examples were good in all the initial strength, the long-term strength and the crack repairing rate. As Comparative Examples, there are known ordinary quick-setting agents of Test No. 7-15 and Test No. 7-16, but these are poor in improving the crack repairing rate. The rebound ratio is generally 20% or more, but some comparative samples had a higher rebound ratio than the general rate. On the other hand, it can be seen that some quick-setting agents of Examples of the invention have a more favorable rebound ratio.

Test No. 7-3 has a good crack repairing rate, but has an extremely long setting time (see Table 1) and is therefore impracticable as a powdered quick-setting agent of the present invention.

Experimental Example 8

Powdered quick-setting agents were prepared in the same manner as in Experimental Example 1 by blending alkali carbonate A, calcium aluminate, calcium hydroxide α, alum a and sodium silicate according to the formulation shown in Table 9 and Table 10, while on the other hand, mortar composed of 800 g of cement 2000 g of fine aggregate, 400 g of water was prepared, and 80 g of the powdered quick-setting agent was added to the mortar to prepare quick-setting mortar (quick-setting material), and immediately after preparation, the flowability reduction time, the setting time and the compression strength of the material were measured. The results are shown in Table 9 and Table 10.

The materials used and the test methods are described below.

"Materials Used"

Cement: prepared by mixing normal Portland cement and blast furnace slag powder in a ratio by mass of 6/4, density 3.04 g/cm³

The quick-setting agent of Test No. 8-5 was added to cement in which the blending ratio by mass of blast furnace slag powder was changed as in Table 11, and the resultant material was tested in the same manner as above to measure the flowability reduction time, the setting time and the compression strength. The results are shown in Table 11.

TABLE 9

| Test No. | Formulation of Powdered Quick-Setting Agent (part) Alkali Carbonate A | Calcium Aluminate | Calcium Hydroxide α | Alum a | Sodium Silicate | Flowability Reduction Time (sec) | Setting Time (min) Start | End | Compression Strength (N/mm²) 1 day | 28 days | Remarks |
|---|---|---|---|---|---|---|---|---|---|---|---|
| 8-1 | 0 | 50 | 20 | 10 | 5 | 3 | 1 | 3 | 2.0 | 35.5 | Example |
| 8-2 | 1 | 50 | 20 | 10 | 5 | 4 | 1 | 4 | 5.3 | 36.0 | Example |
| 8-3 | 3 | 50 | 20 | 10 | 5 | 4 | 1.25 | 4 | 6.5 | 34.3 | Example |
| 8-4 | 5 | 50 | 20 | 10 | 5 | 4 | 1.25 | 3 | 8.2 | 34.1 | Example |
| 8-5 | 10 | 50 | 20 | 10 | 5 | 5 | 1.5 | 5 | 10.3 | 33.9 | Example |
| 8-6 | 20 | 50 | 20 | 10 | 5 | 5 | 1.5 | 6 | 11.1 | 33.7 | Example |
| 8-7 | 25 | 50 | 20 | 10 | 5 | 15 | 2 | 10 | 12.2 | 30.0 | Example |
| 8-8 | 10 | 0 | 20 | 10 | 5 | 10 | 40 | 200 | 5.0 | 27.5 | Comparative Example |
| 8-9 | 10 | 25 | 20 | 10 | 5 | 10 | 4 | 30 | 5.5 | 39.3 | Example |
| 8-10 | 10 | 30 | 20 | 10 | 5 | 10 | 3 | 20 | 8.3 | 37.8 | Example |
| 8-11 | 10 | 40 | 20 | 10 | 5 | 3 | 1.5 | 10 | 9.0 | 36.7 | Example |
| 8-5 | 10 | 50 | 20 | 10 | 5 | 5 | 1.5 | 5 | 10.3 | 33.9 | Example |
| 8-12 | 10 | 70 | 20 | 10 | 5 | 4 | 0.75 | 4 | 9.1 | 31.9 | Example |

TABLE 9-continued

| | Formulation of Powdered Quick-Setting Agent (part) | | | | Flowability | Setting Time (min) | | Compression Strength (N/mm²) | | |
|---|---|---|---|---|---|---|---|---|---|---|---|
| Test No. | Alkali Carbonate A | Calcium Aluminate | Calcium Hydroxide α | Alum a | Sodium Silicate | Reduction Time (sec) | Start | End | 1 day | 28 days | Remarks |
| 8-13 | 10 | 75 | 20 | 10 | 5 | 2 | 0.75 | 3 | 5.8 | 30.8 | Example |
| 8-14 | 10 | 50 | 0 | 10 | 5 | 10 | 1.25 | 8 | 7.9 | 24.3 | Example |
| 8-15 | 10 | 50 | 5 | 10 | 5 | 3 | 1 | 5 | 8.8 | 30.8 | Example |
| 8-16 | 10 | 50 | 10 | 10 | 5 | 3 | 1.25 | 6 | 9.3 | 33.3 | Example |
| 8-5 | 10 | 50 | 20 | 10 | 5 | 5 | 1.5 | 5 | 10.3 | 33.9 | Example |
| 8-17 | 10 | 50 | 25 | 10 | 5 | 5 | 1.5 | 5 | 8.3 | 33.8 | Example |
| 8-18 | 10 | 50 | 35 | 10 | 5 | 5 | 1.5 | 5 | 6.2 | 33.6 | Example |

TABLE 10

| | Formulation of Powdered Quick-Setting Agent (part) | | | | Flowability | Setting Time (min) | | Compression Strength (N/mm²) | | |
|---|---|---|---|---|---|---|---|---|---|---|---|
| Test No. | Alkali Carbonate A | Calcium Aluminate | Calcium Hydroxide α | Alum a | Sodium Silicate | Reduction Time (sec) | Start | End | 1 day | 28 days | Remarks |
| 8-19 | 10 | 50 | 20 | 0 | 5 | 9 | 0.75 | 5 | 3.9 | 29.3 | Example |
| 8-20 | 10 | 50 | 20 | 0.5 | 5 | 6 | 1 | 4 | 8.3 | 31.0 | Example |
| 8-21 | 10 | 50 | 20 | 5 | 5 | 5 | 1.5 | 5 | 9.1 | 34.3 | Example |
| 8-5 | 10 | 50 | 20 | 10 | 5 | 5 | 1.5 | 5 | 10.3 | 33.9 | Example |
| 8-22 | 10 | 50 | 20 | 20 | 5 | 3 | 1.25 | 5 | 10.5 | 33.5 | Example |
| 8-23 | 10 | 50 | 20 | 25 | 5 | 3 | 1.5 | 6 | 10.3 | 33.8 | Example |
| 8-24 | 10 | 50 | 20 | 10 | 0 | 60 | 2 | 5 | 10.8 | 35.3 | Comparative Example |
| 8-25 | 10 | 50 | 20 | 10 | 0.5 | 30 | 1.75 | 20 | 10.1 | 34.9 | Example |
| 8-26 | 10 | 50 | 20 | 10 | 1 | 20 | 1.5 | 6 | 10.5 | 35.0 | Example |
| 8-5 | 10 | 50 | 20 | 10 | 5 | 5 | 1.5 | 5 | 10.3 | 33.9 | Example |
| 8-27 | 10 | 50 | 20 | 10 | 10 | 4 | 1.5 | 4 | 9.9 | 33.1 | Example |
| 8-28 | 10 | 50 | 20 | 10 | 20 | 3 | 0.75 | 5 | 8.5 | 32.2 | Example |
| 8-29 | 10 | 50 | 20 | 10 | 25 | 2 | 1 | 4 | 4.0 | 25.5 | Example |
| 8-30 | — | 80 | — | — | 20 | 7 | 1.25 | 9 | 6.3 | 31.2 | Example |

TABLE 11

| | Formulation of Powdered Quick-Setting Agent (part) | | Flowability | Setting Time (min) | | Compression Strength (N/mm²) | | |
|---|---|---|---|---|---|---|---|---|
| Test No. | Normal Portland Cement | Blast Furnace Slag Powder | Reduction Time (sec) | Start | End | 1 day | 28 days | Remarks |
| 8-31 | 20 | 80 | 15 | 2 | 15 | 2.0 | 37.1 | Example |
| 8-32 | 40 | 60 | 9 | 1.75 | 9 | 5.4 | 36.4 | Example |
| 8-5 | 60 | 40 | 5 | 1.5 | 5 | 10.3 | 33.9 | Example |
| 8-33 | 80 | 20 | 5 | 1 | 3 | 11.7 | 32.5 | Example |

As in Table 9 and Table 10, the powdered quick-setting agents containing alkali carbonate A, calcium aluminate, calcium hydroxide α and alum a were effective for shortening a flowability reduction time, not delaying a setting time and securing a high compression strength even for cement mixed with a blast furnace slag powder.

As in Table 11, when the blending ratio by mass of a blast furnace slag powder in cement was changed, the quick-setting agents were still good in the flowability reduction time, the setting time and the compression strength.

Examples of Second Aspect of Invention

Experimental Example 1

Alkali carbonate A, calcium aluminate, calcium hydroxide, alum a, sodium silicate and alkali metal sulfate (ii) were mixed according to the blending formulation shown in Table 1 and Table 2 to prepare a powdered quick-setting agent, while on the other hand, mortar composed of 800 g of cement 2000 g of fine aggregate, 400 g of water was prepared, and 80 g of the powdered quick-setting agent was added to the mortar to prepare quick-setting mortar (quick-setting material), and immediately after preparation, the flowability reduction time, the setting time and the compression strength of the material were measured. The results are shown in Table 12 and Table 13.

The materials used and the test methods are described below.

"Materials Used"

Cement: commercial product, normal Portland cement, density 3.15 g/cm³

Fine aggregate: river sand from Himekawa river system of Niigata prefecture, density 2.61 g/cm³

Water: industrial water

Alkali carbonate A: commercial product, sodium carbonate, Blaine 1200 cm²/g

Calcium aluminate: Raw materials were crushed and mixed so as to have a molar ratio CaO/Al$_2$O$_3$ of 2.5, then melted in an electric furnace and rapidly cooled. Degree of vitrification 90%, Blaine 5500 cm²/g Calcium hydroxide: commercial product corresponding to Slaked Lime No. 2 defined in JIS R 9001

Alum a: potassium alum 12-hydrate, commercial product, Blaine 600 cm²/g

Sodium silicate: SiO$_2$/Na$_2$O molar ratio 1.0, Blaine 600 cm²/g, commercial product, anhydride Alkali metal sulfate (ii): sodium sulfate, Blaine 500 cm²/g, commercial product, anhydride "Test Methods"

Flowability Reduction Time:

A powdered quick-setting agent was added to the prepared mortar, then kneaded with a mortar mixer for 10 seconds at a high-speed mode, and the time for mortar flowability reduction was measured by finger touch.

In finger touch immediately after addition of agent, a state where a finger could no more penetrate into the sample was considered to be a state of flowability reduction.

Setting Time:

A powdered quick-setting agent was added to the prepared mortar, then quickly packed in a formwork exclusive for proctor test, and the start time for setting and the end time of setting after addition of the powdered quick-setting agent were measured (according to ASTM C403).

Compression Strength:

Like that for measurement of the setting time, the compression strength (N/mm²) after preparation of the quick-setting mortar was measured. The material age was 3 hours, 1 day and 28 days (according to JSCE D102).

TABLE 12

| | Formulation of Powdered Quick-Setting Agent (part) | | | | | | | | | | | |
|---|---|---|---|---|---|---|---|---|---|---|---|---|
| Test No. | Alkali Carbonate A | Calcium Aluminate | Calcium Hydroxide | Alum a | Sodium Silicate | Alkali Metal Sulfate (ii) | Flowability Reduction Time (sec) | Setting Time (min) Start | Setting Time (min) End | Compression Strength (N/mm²) 3 hrs | Compression Strength (N/mm²) 1 day | Compression Strength (N/mm²) 28 days | Remarks |
| 1-1 | 0 | 50 | 20 | 10 | 5 | 10 | 2 | 0.5 | 3 | 1.4 | 6.6 | 33.6 | Example |
| 1-2 | 1 | 50 | 20 | 10 | 5 | 10 | 2 | 0.75 | 3 | 1.6 | 6.9 | 32.5 | Example |
| 1-3 | 3 | 50 | 20 | 10 | 5 | 10 | 2 | 0.75 | 3 | 1.7 | 8.4 | 32.4 | Example |
| 1-4 | 5 | 50 | 20 | 10 | 5 | 10 | 2 | 0.75 | 4 | 1.9 | 11.2 | 32.1 | Example |
| 1-5 | 10 | 50 | 20 | 10 | 5 | 10 | 3 | 0.75 | 4 | 2.2 | 12.2 | 32.0 | Example |
| 1-6 | 20 | 50 | 20 | 10 | 5 | 10 | 3 | 1 | 5 | 2.4 | 13.3 | 32.0 | Example |
| 1-7 | 25 | 50 | 20 | 10 | 5 | 10 | 10 | 2 | 8 | 2.5 | 15.5 | 30.2 | Example |
| 1-8 | 10 | 0 | 20 | 10 | 5 | 10 | 6 | 32 | 240 | 0.4 | 7.1 | 24.3 | Comparative Example |
| 1-9 | 10 | 25 | 20 | 10 | 5 | 10 | 6 | 5 | 40 | 0.7 | 8.3 | 34.0 | Example |
| 1-10 | 10 | 30 | 20 | 10 | 5 | 10 | 5 | 3 | 15 | 1.2 | 10.6 | 34.0 | Example |
| 1-11 | 10 | 40 | 20 | 10 | 5 | 10 | 3 | 2 | 7 | 1.9 | 11.4 | 32.6 | Example |
| 1-5 | 10 | 50 | 20 | 10 | 5 | 10 | 3 | 0.75 | 4 | 2.2 | 12.2 | 32.0 | Example |
| 1-12 | 10 | 70 | 20 | 10 | 5 | 10 | 2 | 0.75 | 2 | 2.8 | 11.1 | 30.1 | Example |
| 1-13 | 10 | 75 | 20 | 10 | 5 | 10 | 1 | 0.5 | 1 | 3.3 | 8.0 | 27.9 | Example |
| 1-14 | 10 | 50 | 0 | 10 | 5 | 10 | 5 | 1 | 6 | 1.8 | 10.6 | 23.1 | Example |
| 1-15 | 10 | 50 | 5 | 10 | 5 | 10 | 3 | 1 | 4 | 1.9 | 12.1 | 29.7 | Example |
| 1-16 | 10 | 50 | 10 | 10 | 5 | 10 | 3 | 0.75 | 4 | 2.0 | 12.6 | 30.8 | Example |
| 1-5 | 10 | 50 | 20 | 10 | 5 | 10 | 3 | 0.75 | 4 | 2.2 | 12.2 | 32.0 | Example |
| 1-17 | 10 | 50 | 25 | 10 | 5 | 10 | 3 | 0.75 | 3 | 2.5 | 11.5 | 32.1 | Example |
| 1-18 | 10 | 50 | 35 | 10 | 5 | 10 | 3 | 0.5 | 3 | 3.1 | 9.4 | 31.5 | Example |

TABLE 13

| | Formulation of Powdered Quick-Setting Agent (part) | | | | | | | | | | | |
|---|---|---|---|---|---|---|---|---|---|---|---|---|
| Test No. | Alkali Carbonate A | Calcium Aluminate | Calcium Hydroxide | Alum a | Sodium Silicate | Alkali Metal Sulfate (ii) | Flowability Reduction Time (sec) | Setting Time (min) Start | Setting Time (min) End | Compression Strength (N/mm²) 3 hrs | Compression Strength (N/mm²) 1 day | Compression Strength (N/mm²) 28 days | Remarks |
| 1-19 | 10 | 50 | 20 | 0 | 5 | 10 | 8 | 0.5 | 3 | 1.5 | 6.1 | 26.0 | Example |
| 1-20 | 10 | 50 | 20 | 0.5 | 5 | 10 | 6 | 0.5 | 3 | 1.6 | 10.4 | 27.2 | Example |
| 1-21 | 10 | 50 | 20 | 5 | 5 | 10 | 4 | 0.75 | 3 | 1.9 | 11.2 | 30.2 | Example |
| 1-5 | 10 | 50 | 20 | 10 | 5 | 10 | 3 | 0.75 | 4 | 2.2 | 12.2 | 32.0 | Example |
| 1-22 | 10 | 50 | 20 | 20 | 5 | 10 | 3 | 0.75 | 4 | 2.6 | 12.9 | 32.0 | Example |
| 1-23 | 10 | 50 | 20 | 25 | 5 | 10 | 2 | 0.75 | 4 | 3.3 | 12.9 | 31.5 | Example |
| 1-24 | 10 | 50 | 20 | 10 | 0 | 10 | 50 | 1 | 4 | 0.9 | 12.6 | 33.0 | Comparative Example |
| 1-25 | 10 | 50 | 20 | 10 | 0.5 | 10 | 25 | 1 | 4 | 1.3 | 12.7 | 32.7 | Example |
| 1-26 | 10 | 50 | 20 | 10 | 1 | 10 | 15 | 0.75 | 4 | 1.8 | 12.3 | 32.5 | Example |
| 1-5 | 10 | 50 | 20 | 10 | 5 | 10 | 3 | 0.75 | 4 | 2.2 | 12.2 | 32.0 | Example |
| 1-27 | 10 | 50 | 20 | 10 | 10 | 10 | 3 | 0.75 | 3 | 2.4 | 11.1 | 30.6 | Example |
| 1-28 | 10 | 50 | 20 | 10 | 20 | 10 | 2 | 0.5 | 3 | 2.5 | 10.3 | 29.1 | Example |
| 1-29 | 10 | 50 | 20 | 10 | 25 | 10 | 1 | 0.5 | 3 | 2.5 | 6.7 | 22.4 | Example |

TABLE 13-continued

| Test No. | Formulation of Powdered Quick-Setting Agent (part) | | | | | | Flowability Reduction Time (sec) | Setting Time (min) | | Compression Strength (N/mm$^2$) | | | Remarks |
|---|---|---|---|---|---|---|---|---|---|---|---|---|---|
| | Alkali Carbonate A | Calcium Aluminate | Calcium Hydroxide | Alum a | Sodium Silicate | Alkali Metal Sulfate (ii) | | Start | End | 3 hrs | 1 day | 28 days | |
| 1-30 | 0 | 80 | 0 | 0 | 20 | 10 | 5 | 0.75 | 5 | 2.3 | 8.8 | 29.6 | Example |
| 1-31 | 10 | 50 | 20 | 10 | 5 | 0 | 3 | 0.75 | 4 | 0.9 | 12.1 | 32.0 | Reference Example |
| 1-32 | 0 | 50 | 20 | 10 | 5 | 0 | 2 | 0.5 | 3 | 0.5 | 3.3 | 33.5 | Reference Example |
| 1-33 | 10 | 0 | 20 | 10 | 5 | 0 | 5 | 30 | 180 | 0.3 | 7.5 | 24.0 | Comparative Example |
| 1-34 | 10 | 50 | 0 | 10 | 5 | 0 | 5 | 0.75 | 5 | 0.6 | 10.5 | 22.0 | Reference Example |
| 1-35 | 10 | 50 | 20 | 0 | 5 | 0 | 7 | 0.5 | 3 | 0.7 | 5.1 | 25.0 | Reference Example |
| 1-36 | 10 | 50 | 20 | 10 | 0 | 0 | 45 | 1 | 4 | 0.5 | 12.5 | 32.0 | Comparative Example |
| 1-37 | 0 | 80 | 0 | 0 | 20 | 0 | 5 | 0.75 | 7 | 1.0 | 7.7 | 29.0 | Reference Example |

From Table 12 and Table 13, it can be seen that, by containing a calcium aluminate, a sodium silicate and an alkali metal sulfate, and preferably further containing, in addition thereto, a calcium hydroxide, an alum and an alkali carbonate, the flowability reduction time was short, the setting time was not delayed and the compression strength was good. In particular, when an alkaline earth metal sulfate is contained, the short-time strength was further improved. It can be seen that the content of each component has its own appropriate level.

Experimental Example 2

The same tests as in Experimental Example 1 were carried out except that sodium silicates having a different molar ratio SiO$_2$/Na$_2$O were used as in Table 14. The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 14 below.

From Table 14, can be seen that, by containing a calcium aluminate and a sodium silicate, the flowability reduction time was short, the setting time was not delayed and the compression strength was good. It is further known that the molar ratio of SiO$_2$/Na$_2$O of sodium silicate has an appropriate numerical range for expressing better properties.

Experimental Example 3

The same tests as in Experimental Example 1 were carried out except that different kinds of sodium silicate hydrate as shown in Table 15 were used. The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 15.

TABLE 14

| Test No. | Sodium Silicate SiO$_2$/Na$_2$O molar ratio | Flowability Reduction Time (sec) | Setting Time (min) | | Compression Strength (N/mm$^2$) | | | Remarks |
|---|---|---|---|---|---|---|---|---|
| | | | Start | End | 3 hrs | 1 day | 28 days | |
| 2-1 | 0.45 | 2 | 0.75 | 3 | 1.2 | 6.1 | 22.7 | Example |
| 2-2 | 0.5 | 2 | 0.75 | 3 | 1.6 | 11.2 | 31.5 | Example |
| 2-8 | 0.67 | 3 | 0.75 | 3 | 1.9 | 11.3 | 32.0 | Example |
| 2-4 | 0.9 | 3 | 0.75 | 4 | 2.1 | 12.2 | 32.0 | Example |
| 1-5 | 1.0 | 3 | 0.75 | 4 | 2.2 | 12.2 | 32.0 | Example |
| 2-5 | 1.3 | 4 | 0.75 | 4 | 2.0 | 12.1 | 32.0 | Example |
| 2-6 | 1.5 | 5 | 0.75 | 4 | 1.7 | 11.1 | 29.5 | Example |
| 2-7 | 2.0 | 10 | 2 | 7 | 1.2 | 7.0 | 23.3 | Example |

TABLE 15

| Test No. | Sodium Silicate Hydrate | Flowability Reduction Time (sec) | Setting Time (min) Start | Setting Time (min) End | Compression Strength (N/mm$^2$) 3 hrs | Compression Strength (N/mm$^2$) 1 day | Compression Strength (N/mm$^2$) 28 days | Remarks |
|---|---|---|---|---|---|---|---|---|
| 1-5 | Anhydride | 4 | 0.75 | 4 | 2.2 | 12.3 | 32.0 | Example |
| 3-1 | 5-Hydrate | 2 | 0.75 | 4 | 2.2 | 11.7 | 31.5 | Example |
| 3-2 | 9-Hydrate | 1 | 0.75 | 4 | 2.0 | 10.7 | 30.8 | Example |

From Table 15, it is considered that any type of sodium silicate hydrate is effective for a powdered quick-setting agent.

Experimental Example 4

Experimental Example 4-1

The same tests as in Experimental Example 1 were carried out except that alkali metal sulfate (i) was used. The powdered quick-setting agent was formulated so as to have the formulation of Test No. 1-5. 80 g of the powdered quick-setting agent was added to mortar to prepare quick-setting mortar, and immediately after preparation, the flowability reduction time, the setting time and the compression strength thereof were measured. The results are shown in Table 16-1.
"Materials Used"
Alkali metal sulfate (i): lithium sulfate, commercial product, Blaine 500 cm$^2$/g

TABLE 16-1

| Test No. | Alkali Metal Sulfate | Flowability Reduction Time (sec) | Setting Time (min) Start | Setting Time (min) End | Compression Strength (N/mm$^2$) 3 hrs | Compression Strength (N/mm$^2$) 1 day | Compression Strength (N/mm$^2$) 28 days | Remarks |
|---|---|---|---|---|---|---|---|---|
| 4-1 | (i) | 3 | 0.75 | 3 | 2.5 | 12.5 | 32.5 | Example |
| 1-5 | (ii) | 4 | 0.75 | 4 | 2.2 | 12.3 | 32.0 | Example |

As in Table 16-1, the flowability reduction time was short, the setting time was not delayed and the compression strength was good even using lithium sulfate.

Experimental Example 4-2

The same tests as in Experimental Example 1 were carried out except that the blending ratio of alkali metal sulfate (ii) was changed as in Table 5-2 below. Except for the blending ratio of alkali metal sulfate (ii) therein, the powdered quick-setting agent was formulated so as to have the formulation of Test No. 1-5. The results are shown in Table 16-2.

As in Table 16-2, it is confirmed that the flowability reduction time and the setting time do not change when the blending amount of the alkali metal sulfate is 3 to 25 parts, and a material age of 1 day is stably secured.

Experimental Example 5

The same tests as in Experimental Example 1 were carried out except that different kinds of alum as shown in Table 17 were used. The powdered quick-setting agent was formulated so as to have the formulation of Test No. 1-5.
80 g of the powdered quick-setting agent was added to mortar to prepare quick-setting mortar, and immediately after preparation, the flowability reduction time, the setting time and the compression strength thereof were measured. The results are shown in Table 17.
"Materials Used"
Alum a: potassium alum 12-hydrate, commercial product, Blaine 600 cm$^2$/g
Alum b: sodium aluminum sulfate 12-hydrate, commercial product, Blaine 700 cm$^2$/g
Alum c: ammonium alum 12-hydrate, commercial product, Blaine 600 cm$^2$/g
Alum d: iron alum 12-hydrate, commercial product, Blaine 600 cm$^2$/g
Alum e: chromium alum 12-hydrate, commercial product, Blaine 600 cm$^2$/g
Alum f: potassium alum anhydride, commercial product, Blaine 600 cm$^2$/g
Alum g: ammonium alum anhydride, commercial product, Blaine 700 cm$^2$/g
Alum h: iron alum mono-hydrate, commercial product, Blaine 600 cm$^2$/g
Alum i: iron alum anhydride, commercial product, Blaine 700 cm$^2$/g

TABLE 16-2

| Test No. | Blending Ratio of Alkali Metal Sulfate (part) | Flowability Reduction Time (sec) | Setting Time (min) Start | Setting Time (min) End | Compression Strength (N/mm$^2$) 3 hrs | Compression Strength (N/mm$^2$) 1 day | Compression Strength (N/mm$^2$) 28 days | Remarks |
|---|---|---|---|---|---|---|---|---|
| 5-1 | 3 | 3 | 0.75 | 4 | 3.5 | 9.5 | 34.0 | Example |
| 5-2 | 5 | 3 | 0.75 | 4 | 3.5 | 11.8 | 33.3 | Example |
| 5-3 | 15 | 3 | 0.75 | 4 | 2.6 | 13.1 | 31.5 | Example |
| 5-4 | 25 | 3 | 0.75 | 4 | 2.0 | 14.5 | 30.6 | Example |
| 5-5 | 30 | 4 | 0.75 | 6 | 1.7 | 15.1 | 28.1 | Example |
| 1-5 | 10 | 3 | 0.75 | 4 | 2.2 | 12.2 | 32.0 | Example |

TABLE 17

| Test No. | Kind of Alum | Flowability Reduction Time (sec) | Setting Time (min) | | Compression Strength (N/mm$^2$) | | | Remarks |
|---|---|---|---|---|---|---|---|---|
| | | | Start | End | 3 hrs | 1 day | 28 days | |
| 1-5 | a | 4 | 0.75 | 4 | 2.2 | 12.3 | 32.0 | Example |
| 5-1 | b | 4 | 0.75 | 5 | 2.0 | 11.3 | 31.3 | Example |
| 5-2 | c | 3 | 0.75 | 4 | 1.7 | 8.8 | 30.1 | Example |
| 5-3 | d | 5 | 1 | 5 | 1.7 | 9.9 | 27.4 | Example |
| 5-4 | e | 20 | 3 | 10 | 1.6 | 7.0 | 25.2 | Example |
| 5-5 | f | 3 | 0.75 | 3 | 2.3 | 13.1 | 33.3 | Example |
| 5-6 | g | 3 | 0.75 | 3 | 1.9 | 9.9 | 26.6 | Example |
| 5-7 | h | 3 | 0.75 | 4 | 1.8 | 9.2 | 28.1 | Example |
| 5-8 | i | 3 | 0.75 | 4 | 1.7 | 10.1 | 29.1 | Example |

As in Table 17, the flowability reduction time was short, the setting time was not delayed and the compression strength was good irrespective of the type of alum. In addition, it can be seen that some types of alum are effective for expressing better properties.

Experimental Example 6

The same tests as in Experimental Example 1 were carried out except that different kinds of alkali carbonate as shown in Table 18 were used. The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 7.

"Materials Used"
Alkali carbonate A: commercial product, sodium carbonate, Blaine 1200 cm$^2$/g
Alkali carbonate B commercial product, sodium sesqui-carbonate, Blaine 1400 cm$^2$/g
Alkali carbonate C commercial product, sodium bicarbonate, Blaine 800 cm$^2$/g
Alkali carbonate D: commercial product, lithium carbonate, Blaine 1000 cm$^2$/g
Alkali carbonate E: commercial product, potassium carbonate, Blaine 1200 cm$^2$/g

TABLE 18

| Test No. | Kind of Alkali Carbonate | Flowability Reduction Time (sec) | Setting Time (min) | | Compression Strength (N/mm$^2$) | | | Remarks |
|---|---|---|---|---|---|---|---|---|
| | | | Start | End | 3 hrs | 1 day | 28 days | |
| 1-5 | A | 4 | 0.75 | 4 | 2.2 | 12.3 | 32.0 | Example |
| 6-1 | B | 4 | 0.75 | 5 | 2.0 | 11.8 | 33.1 | Example |
| 6-2 | C | 5 | 0.75 | 7 | 1.8 | 9.1 | 34.3 | Example |
| 6-3 | D | 20 | 1 | 20 | 1.5 | 6.6 | 29.9 | Example |
| 6-4 | E | 5 | 0.75 | 8 | 2.0 | 11.7 | 32.2 | Example |

As in Table 18, the flowability reduction time was short, the setting time was not delayed and the compression strength was good irrespective of the type of alkali carbonate. In addition, it can be seen that some types of alkali carbonate are effective for expressing better properties.

Experimental Example 7

The same tests as in Experimental Example 1 were carried out except that calcium aluminates having a different molar ratio CaO/Al$_2$O$_3$ as in Table 19 were used. The powdered quick-setting agent was formulated so as to have the formulation of Test No. 1-5. The calcium aluminates were prepared to have Blaine of 5500±200 cm$^2$/g.

80 g of the powdered quick-setting agent was added to mortar to prepare quick-setting mortar, and immediately after preparation, the flowability reduction time, the setting time and the compression strength thereof were measured. The results are shown in Table 19.

TABLE 19

| Test No. | Calcium Aluminate CaO/A$_2$O$_3$ molar ratio | Flowability Reduction Time (sec) | Setting Time (min) | | Compression Strength (N/mm$^2$) | | | Remarks |
|---|---|---|---|---|---|---|---|---|
| | | | Start | End | 3 hrs | 1 day | 28 days | |
| 1-5 | 2.5 | 4 | 0.75 | 4 | 2.2 | 12.3 | 32.0 | Example |
| 7-1 | 1.9 | 9 | 2.0 | 7 | 2.3 | 13.7 | 33.1 | Example |
| 7-2 | 2.0 | 3 | 0.75 | 5 | 2.2 | 13.0 | 33.2 | Example |
| 7-3 | 2.6 | 2 | 0.75 | 4 | 2.1 | 12.2 | 31.8 | Example |
| 7-4 | 3.0 | 2 | 0.75 | 5 | 2.0 | 12.0 | 29.2 | Example |
| 7-5 | 3.1 | 5 | 5.0 | 25 | 1.6 | 8.5 | 27.6 | Example |

From the results in Table 19, it can be seen that, when the molar ratio CaO/Al$_2$O$_3$ in calcium aluminates was 2.0 to 3.0, the flowability reduction time and the setting time were short and the compression strength was good.

Experimental Example 8

Concrete of 360 kg of cement, 216 kg of water, 1049 kg of fine aggregate and 716 kg of coarse aggregate (No. 6 crushed stone from Himekawa river system of Niigata prefecture, density 2.67 g/cm$^3$) was prepared. The concrete was pumped at a rate of 10 m$^3$/h using a concrete pump MKW-25SMT from SHINTEC Co., Ltd., and on the way, mixed to be a merged stream with compressed air from a separate system, and pneumatically conveyed. Further, at a point of 3 m before ejection, a powdered quick-setting agent shown in Table 20 below as mixed to be a merged stream with the thus-pneumatically conveyed concrete using a conveyer system DENKA NATMCREAT in such a manner that the agent could be 10 parts relative to 100 parts of the cement, thereby preparing SPRAY CONCRETE, which was then sprayed onto an iron plate through a nozzle tip. The initial strength, the long-term strength, the rebound ratio, and the crack repairing rate after spraying are shown in Table 20.

The same concrete as in Experimental Example 8 was mixed to be a merged stream with an ordinary quick-setting agent, DENKA NATMIC TYPE-5 (quick-setting agent No. T-5 containing a calcium aluminate as the main ingredient and not containing an alkali metal silicate and an alkali metal sulfate) that had been pneumatically conveyed, in such a manner that the agent could be 10 parts (Test No. 8-15) relative to 100 parts of cement to prepare spray concrete, which was sprayed onto an iron plate through a nozzle tip. Also similarly, the quick-setting agent No. T-5 was mixed to be a merged stream with concrete that had been pneumatically conveyed in such a manner that the agent could be 7 parts (Test No. 8-16) relative to 100 parts of cement to prepare spray concrete, which was sprayed onto an iron plate through a nozzle tip. The initial strength, the long-term strength, the rebound ratio, and the crack repairing rate after spraying are shown in Table 20.

"Test Methods":
Initial Strength:
Sprayed onto a formwork according to JSCE-G561, the pull-out strength of the sample at a time of a material age of 10 minutes, 3 hours and 1 day was converted into a compression strength to determine the initial strength thereof.

Long-Term Strength:
Sprayed onto a formwork according to JSCE-F561, JIS A1107, a core of the sample was collected at a time of a material age of 7 days and 28 days, and the compression strength thereof was measured.

Rebound:
The rebound in spraying for 3 minutes to a simulated tunnel having an excavation cross-sectional surface of 15 m$^2$ was measured according to JSCE-F563, and the rebound ratio from the spray concrete used was determined according to the following expression.

$$\text{Rebound Ratio} = \text{Amount of dropped spray concrete (kg)/amount of spray concrete used for spraying (kg)} \times 100(\%) \quad \text{(Expression)}$$

The rebound ratio is preferably 20% or less.

Crack Repairing Rate:
Spray concrete was sprayed onto each of two formworks of 10 cm×10 cm×40 cm to prepare test bodies. Immediately after preparation, the two test bodies were fixed, as separated by a clearance of 0.1 mm therebetween in such a manner that the 40 cm surface could be in parallel to each other, and cured in water at 20° C. for 6 months, and the test bodies were observed with a microscope to determine the repairing rate for the clearance having a width of 0.1 mm.

The crack repairing rate is preferably 50% or more.

TABLE 20

| Test No. | Test No. of Powdered QuickSetting Agent | Rebound (%) | Initial Strength (N/mm$^2$) | | | Long-Term Strength (N/mm$^2$) | | Crack Repairing Rate (%) | Remarks |
|---|---|---|---|---|---|---|---|---|---|
| | | | 10 min | 3 hrs | 1 day | 7 days | 28 days | | |
| 8-1 | 1-5 | 15 | 1.8 | 3.0 | 9.5 | 26.6 | 34.2 | 100 | Example |
| 8-2 | 1-1 | 19 | 0.7 | 2.2 | 6.1 | 27.5 | 35.3 | 100 | Example |
| 8-3 | 1-33 | 65 | 0 | 0.5 | 5.9 | 19.5 | 25.0 | 80 | Comparative Example |

TABLE 20-continued

| Test No. | Test No. of Powdered QuickSetting Agent | Rebound (%) | Initial Strength (N/mm$^2$) 10 min | 3 hrs | 1 day | Long-Term Strength (N/mm$^2$) 7 days | 28 days | Crack Repairing Rate (%) | Remarks |
|---|---|---|---|---|---|---|---|---|---|
| 8-4 | 1-36 | 80 | 0.4 | 1.7 | 8.1 | 23.2 | 32.9 | 30 | Comparative Example |
| 8-5 | 2-1 | 23 | 0.4 | 1.8 | 7.1 | 18.5 | 23.3 | 50 | Example |
| 8-6 | 2-5 | 16 | 1.0 | 2.8 | 13.1 | 25.7 | 33.5 | 100 | Example |
| 8-7 | 2-6 | 35 | 0.8 | 2.5 | 11.9 | 20.5 | 30.5 | 100 | Example |
| 8-8 | 3-2 | 17 | 0.7 | 2.4 | 11.1 | 20.0 | 31.0 | 50 | Example |
| 8-9 | 5-4 | 30 | 0.5 | 2.0 | 8.5 | 18.1 | 27.5 | 50 | Example |
| 8-10 | 6-2 | 20 | 0.6 | 2.2 | 10.5 | 27.5 | 34.0 | 60 | Example |
| 8-11 | 6-3 | 30 | 0.4 | 1.7 | 8.2 | 24.2 | 30.0 | 60 | Example |
| 8-12 | 7-1 | 28 | 1.2 | 2.9 | 14.1 | 24.5 | 32.5 | 70 | Example |
| 8-13 | 7-4 | 25 | 1.0 | 2.7 | 13.2 | 25.1 | 33.3 | 70 | Example |
| 8-14 | 7-5 | 19 | 0.4 | 1.9 | 9.9 | 22.3 | 29.4 | 70 | Example |
| 8-15 | T-5 10 pts | 22 | 1.1 | 1.9 | 9.5 | 25.6 | 33.0 | 10 | Comparative Example |
| 8-16 | T-5 7 pts | 25 | 0.6 | 1.5 | 8.9 | 25.1 | 30.0 | 45 | Comparative Example |
| 8-17 | 1-30 | 21 | 1.3 | 2.7 | 9.3 | 22.7 | 30.3 | 70 | Example |

As in Table 20, the samples of Examples were good in all the initial strength, the long-term strength and the crack repairing rate. As Comparative Examples, there are known ordinary quick-setting agents of Test No. 8-15 and Test No. 8-16, but these are poor in improving the crack repairing rate. The rebound ratio is generally 20% or more, but some comparative samples had a higher rebound ratio than the general rate. On the other hand, it can be seen that some quick-setting agents of Examples of the invention have a more favorable rebound ratio.

Test No. 8-3 has a good crack repairing rate, but has an extremely long setting time (see Table 12) and is therefore impracticable as a powdered quick-setting agent of the present invention.

Examples of Third Aspect of Invention

Experimental Example 1

Alkali carbonate A, calcium aluminate, calcium hydroxide, alum a, sodium silicate and alkaline earth metal sulfate (ii) were mixed according to the blending formulation shown in Table 1 and Table 2 to prepare a powdered quick-setting agent, while on the other hand, mortar composed of 800 g of cement 2000 g of fine aggregate, 400 g of water was prepared, and 80 g of the powdered quick-setting agent was added to the mortar to prepare quick-setting mortar (quick-setting material), and immediately after preparation, the flowability reduction time, the setting time and the compression strength of the material were measured. The results are shown in Table 21 and Table 22.

The materials used and the test methods are described below.
"Materials Used"
Cement: commercial product, normal Portland cement, density 3.15 g/cm$^3$
Fine aggregate: river sand from Himekawa river system of Niigata prefecture, density 2.61 g/cm$^3$
Water: industrial water
Alkali carbonate A: commercial product, sodium carbonate, Blaine 1200 cm$^2$/g
Calcium aluminate: Raw materials were crushed and mixed so as to have a molar ratio CaO/Al$_2$O$_3$ of 2.5, then melted in an electric furnace and rapidly cooled. Degree of vitrification 90%, Blaine 5500 cm$^2$/g
Calcium hydroxide: commercial product corresponding to Slaked Lime No. 2 defined in JIS R 9001
Alum a: potassium alum 12-hydrate, commercial product, Blaine 600 cm$^2$/g
Sodium silicate: SiO$_2$/Na$_2$O molar ratio 1.0, Blaine 600 cm$^2$/g, commercial product, anhydride
Alkaline earth metal sulfate (i): natural anhydrite, Blaine 4500 cm$^2$/g, crushed product
"Test Method"
Flowability Reduction Time:

A powdered quick-setting agent was added to the prepared mortar, then kneaded with a mortar mixer for 10 seconds at a high-speed mode, and the time for mortar flowability reduction was measured by finger touch.

In finger touch, a state where a finger could not penetrate into the sample as compared with a fresh sample immediately after kneading with the quick-setting agent was considered to be a state of flowability reduction.

Setting Time:

A powdered quick-setting agent was added to the prepared mortar, then quickly packed in a formwork exclusive for proctor test, and the start time for setting and the end time of setting after addition of the powdered quick-setting agent were measured (according to ASTM C403).

Compression Strength:

Like that for measurement of the setting time, the compression strength (N/mm$^2$) after preparation of the quick-setting mortar was measured. The material age was 3 hours, 1 day and 28 days (according to JSCE D102).

In Experimental Examples 1 to 8, the test temperature was 25° C., and in Experimental Example 9, the test temperature was 35° C.

TABLE 21

Formulation of Powdered Quick-Setting Agent (part)

| Test No. | Alkali Carbonate A | Calcium Aluminate | Hydroxide α | Alum a | Sodium Silicate | Alkaline Earth Metal Sulfate (i) | Flowability Reduction Time (sec) | Setting Time (min) Start | Setting Time (min) End | Compression Strength (N/mm²) 3 hrs | Compression Strength (N/mm²) 1 day | Compression Strength (N/mm²) 28 days | Remarks |
|---|---|---|---|---|---|---|---|---|---|---|---|---|---|
| 1-1 | 0 | 50 | 20 | 10 | 5 | 40 | 2 | 0.5 | 4 | 2.4 | 8.7 | 36.6 | Example |
| 1-2 | 1 | 50 | 20 | 10 | 5 | 40 | 3 | 0.75 | 3 | 2.6 | 9.2 | 35.5 | Example |
| 1-3 | 3 | 50 | 20 | 10 | 5 | 40 | 3 | 0.75 | 3 | 2.7 | 10.4 | 35.4 | Example |
| 1-4 | 5 | 50 | 20 | 10 | 5 | 40 | 3 | 0.75 | 3 | 2.9 | 13.2 | 35.1 | Example |
| 1-5 | 10 | 50 | 20 | 10 | 5 | 40 | 3 | 0.75 | 4 | 3.4 | 14.2 | 35.7 | Example |
| 1-6 | 20 | 50 | 20 | 10 | 5 | 40 | 3 | 1 | 5 | 3.6 | 15.2 | 35.5 | Example |
| 1-7 | 25 | 50 | 20 | 10 | 5 | 40 | 10 | 2 | 8 | 3.5 | 16.5 | 34.1 | Example |
| 1-8 | 10 | 0 | 20 | 10 | 5 | 40 | 6 | 40 | 260 | 0.4 | 7.2 | 26.3 | Comparative Example |
| 1-9 | 10 | 25 | 20 | 10 | 5 | 40 | 5 | 6 | 50 | 1.9 | 12.1 | 34.9 | Example |
| 1-10 | 10 | 30 | 20 | 10 | 5 | 40 | 5 | 3 | 20 | 2.3 | 13.2 | 35.0 | Example |
| 1-11 | 10 | 40 | 20 | 10 | 5 | 40 | 4 | 2 | 8 | 3.0 | 14.3 | 36.7 | Example |
| 1-5 | 10 | 50 | 20 | 10 | 5 | 40 | 3 | 0.75 | 4 | 3.4 | 14.2 | 35.7 | Example |
| 1-12 | 10 | 70 | 20 | 10 | 5 | 40 | 1 | 0.75 | 2 | 3.8 | 16.4 | 36.8 | Example |
| 1-13 | 10 | 75 | 20 | 10 | 5 | 40 | 1 | 0.5 | 1 | 3.8 | 10.8 | 30.8 | Example |
| 1-14 | 10 | 50 | 0 | 10 | 5 | 40 | 6 | 2 | 7 | 3.3 | 13.6 | 29.1 | Example |
| 1-15 | 10 | 50 | 5 | 10 | 5 | 40 | 3 | 1 | 5 | 3.4 | 15.1 | 33.2 | Example |
| 1-16 | 10 | 50 | 10 | 10 | 5 | 40 | 3 | 0.75 | 4 | 3.6 | 15.8 | 34.7 | Example |
| 1-5 | 10 | 50 | 20 | 10 | 5 | 40 | 3 | 0.75 | 4 | 3.4 | 14.2 | 35.7 | Example |
| 1-17 | 10 | 50 | 25 | 10 | 5 | 40 | 3 | 0.75 | 3 | 4.0 | 16.1 | 35.1 | Example |
| 1-18 | 10 | 50 | 35 | 10 | 5 | 40 | 3 | 0.5 | 3 | 4.3 | 12.1 | 34.4 | Example |

TABLE 22

Formulation of Powdered Quick-Setting Agent (part)

| Test No. | Alkali Carbonate A | Calcium Aluminate | Hydroxide α | Alum a | Sodium Silicate | Alkaline Earth Metal Sulfate (i) | Flowability Reduction Time (sec) | Setting Time (min) Start | Setting Time (min) End | Compression Strength (N/mm²) 3 hrs | Compression Strength (N/mm²) 1 day | Compression Strength (N/mm²) 28 days | Remarks |
|---|---|---|---|---|---|---|---|---|---|---|---|---|---|
| 1-19 | 10 | 50 | 20 | 0 | 5 | 40 | 7 | 0.5 | 3 | 2.8 | 8.4 | 30.0 | Example |
| 1-20 | 10 | 50 | 20 | 0.5 | 5 | 40 | 5 | 0.5 | 3 | 3.0 | 12.4 | 31.2 | Example |
| 1-21 | 10 | 50 | 20 | 5 | 5 | 40 | 4 | 0.75 | 3 | 3.2 | 13.2 | 33.2 | Example |
| 1-5 | 10 | 50 | 20 | 10 | 5 | 40 | 3 | 0.75 | 4 | 3.4 | 14.2 | 35.7 | Example |
| 1-22 | 10 | 50 | 20 | 20 | 5 | 40 | 3 | 0.75 | 4 | 4.3 | 14.9 | 36.7 | Example |
| 1-23 | 10 | 50 | 20 | 25 | 5 | 40 | 2 | 0.75 | 4 | 4.2 | 14.8 | 35.5 | Example |
| 1-24 | 10 | 50 | 20 | 10 | 0 | 40 | 60 | 2 | 5 | 0.9 | 13.6 | 33.9 | Comparative Example |
| 1-25 | 10 | 50 | 20 | 10 | 0.5 | 40 | 35 | 2 | 5 | 1.5 | 14.7 | 34.7 | Example |
| 1-26 | 10 | 50 | 20 | 10 | 1 | 40 | 20 | 1 | 4 | 2.8 | 15.3 | 35.5 | Example |
| 1-5 | 10 | 50 | 20 | 10 | 5 | 40 | 3 | 0.75 | 4 | 3.4 | 14.2 | 35.7 | Example |
| 1-27 | 10 | 50 | 20 | 10 | 10 | 40 | 3 | 0.75 | 3 | 4.0 | 15.7 | 35.8 | Example |
| 1-28 | 10 | 50 | 20 | 10 | 20 | 40 | 2 | 0.5 | 3 | 4.1 | 14.2 | 32.1 | Example |
| 1-29 | 10 | 50 | 20 | 10 | 25 | 40 | 1 | 0.5 | 2 | 3.5 | 10.1 | 28.4 | Example |
| 1-30 | 0 | 80 | 0 | 0 | 20 | 40 | 6 | 0.75 | 9 | 4.1 | 11.4 | 33.1 | Example |
| 1-31 | 10 | 50 | 20 | 10 | 5 | 0 | 3 | 0.75 | 4 | 0.9 | 12.1 | 32.0 | Reference Example |
| 1-32 | 0 | 50 | 20 | 10 | 5 | 0 | 2 | 0.5 | 3 | 0.5 | 3.3 | 33.5 | Reference Example |
| 1-33 | 10 | 0 | 20 | 10 | 5 | 0 | 5 | 30 | 180 | 0.3 | 7.5 | 24.0 | Comparative Example |
| 1-34 | 10 | 50 | 0 | 10 | 5 | 0 | 5 | 0.75 | 5 | 0.6 | 10.5 | 22.0 | Reference Example |
| 1-35 | 10 | 50 | 20 | 0 | 5 | 0 | 7 | 0.5 | 3 | 0.7 | 5.1 | 25.0 | Reference Example |
| 1-36 | 10 | 50 | 20 | 10 | 0 | 0 | 45 | 1 | 4 | 0.5 | 12.5 | 32.0 | Comparative Example |
| 1-37 | 0 | 80 | 0 | 0 | 20 | 0 | 5 | 0.75 | 7 | 1.0 | 7.7 | 29.0 | Reference Example |

From Table 21 and Table 22, it can be seen that, by containing a calcium aluminate, a sodium silicate and an alkaline earth metal sulfate, and preferably further containing, in addition thereto, a calcium hydroxide, an alum and an alkali carbonate, the flowability reduction time was short, the setting time was not delayed and the compression strength was good. In particular, when alkaline earth metal sulfate is contained, the short-time and long-term compression strength was further improved. It can be seen that the content of each component has its own appropriate level.

Experimental Example 2

The same tests as in Experimental Example 1 were carried out except that sodium silicates having a different molar ratio $SiO_2/Na_2O$ were used as in Table 23. The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 23 below.

TABLE 23

| Test No. | Sodium Silicate $SiO_2/Na_2O$ molar ratio | Flowability Reduction Time (sec) | Setting Time (min) | | Compression Strength (N/mm$^2$) | | | Remarks |
| --- | --- | --- | --- | --- | --- | --- | --- | --- |
| | | | Start | End | 3 hrs | 1 day | 28 days | |
| 2-1 | 0.45 | 2 | 0.75 | 3 | 3.1 | 8.2 | 28.1 | Example |
| 2-2 | 0.5 | 3 | 0.75 | 3 | 3.4 | 13.8 | 35.3 | Example |
| 2-3 | 0.67 | 4 | 0.75 | 3 | 3.6 | 14.0 | 36.1 | Example |
| 2-4 | 0.9 | 5 | 0.75 | 3 | 3.9 | 15.9 | 37.1 | Example |
| 1-5 | 1.0 | 3 | 0.75 | 4 | 3.4 | 14.2 | 35.7 | Example |
| 2-5 | 1.3 | 5 | 0.75 | 4 | 3.5 | 14.4 | 34.5 | Example |
| 2-6 | 1.5 | 5 | 0.75 | 5 | 3.3 | 13.6 | 32.2 | Example |
| 2-7 | 2.0 | 10 | 2 | 6 | 3.0 | 9.0 | 27.9 | Example |

From Table 23, it can be seen that, by containing a calcium aluminate, a sodium silicate and an alkaline earth metal sulfate, the flowability reduction time was short, the setting time was not delayed and the compression strength was good. It is further known that the molar ratio of $SiO_2/Na_2O$ of sodium silicate has an appropriate numerical range for expressing better properties.

Experimental Example 3

The same tests as in Experimental Example 1 were carried out except that different kinds of sodium silicate hydrate as shown in Table 24 were used. The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 24.

TABLE 24

| Test No. | Sodium Silicate Hydrate | Flowability Reduction Time (sec) | Setting Time (min) | | Compression Strength (N/mm$^2$) | | | Remarks |
| --- | --- | --- | --- | --- | --- | --- | --- | --- |
| | | | Start | End | 3 hrs | 1 day | 28 days | |
| 1-5 | Anhydride | 3 | 0.75 | 4 | 3.4 | 14.2 | 35.7 | Example |
| 3-1 | 5-Hydrate | 4 | 0.75 | 4 | 3.6 | 15.5 | 35.5 | Example |
| 3-2 | 9-Hydrate | 2 | 0.75 | 4 | 3.3 | 13.2 | 33.5 | Example |

From Table 24, it is considered that any type of sodium silicate hydrate is effective for a powdered quick-setting agent.

Experimental Example 4

Experimental Example 4-1

The same tests as in Experimental Example 1 were carried out except that alkaline earth metal sulfate (ii) was used. The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 25-1.
"Materials Used"
Alkaline earth metal sulfate (ii): magnesium sulfate, commercial product, Blaine 1500 $cm^2/g$

TABLE 25-1

| Test No. | Alkaline Earth Metal Sulfate | Flowability Reduction Time (sec) | Setting Time (min) | | Compression Strength (N/mm$^2$) | | | Remarks |
|---|---|---|---|---|---|---|---|---|
| | | | Start | End | 3 hrs | 1 day | 28 days | |
| 4-1 | (ii) | 6 | 0.75 | 5 | 3.9 | 16.8 | 36.5 | Example |
| 1-5 | (i) | 3 | 0.75 | 4 | 3.4 | 14.2 | 35.7 | Example |

As in Table 25-1, the flowability reduction time was short, the setting time was not delayed and the compression strength was good even using magnesium sulfate.

Experimental Example 4-2

The same tests as in Experimental Example 1 were carried out except that the blending ratio of alkaline earth metal sulfate (i) was changed as in Table 25-2 below. Except for the blending ratio of alkaline earth metal sulfate (i) therein, the powdered quick-setting agent was formulated so as to have the formulation of Test No. 1-5. The results are shown in Table 25-2.

TABLE 25-2

| Test No. | Blending Ratio of Alkaline Earth Metal Sulfate (part) | Flowability Reduction Time (sec) | Setting Time (min) | | Compression Strength (N/mm$^2$) | | | Remarks |
|---|---|---|---|---|---|---|---|---|
| | | | Start | End | 3 hrs | 1 day | 28 days | |
| 5-1 | 15 | 1 | 0.75 | 3 | 4.1 | 13.6 | 30.2 | Example |
| 5-2 | 20 | 3 | 0.75 | 3 | 4.3 | 13.5 | 33.1 | Example |
| 5-3 | 30 | 3 | 0.75 | 4 | 3.5 | 13.1 | 35.6 | Example |
| 5-5 | 50 | 4 | 0.75 | 4 | 3.6 | 13.6 | 35.0 | Example |
| 5-6 | 60 | 6 | 1 | 5 | 2.2 | 13.2 | 36.1 | Example |
| 5-7 | 65 | 10 | 2 | 14 | 1.9 | 13.1 | 36.2 | Example |
| 1-5 | 40 | 3 | 0.75 | 4 | 3.4 | 14.2 | 35.7 | Example |

As in Table 25-2, it is confirmed that, especially when the blending amount of the alkaline earth metal sulfate is 20 to 60 parts, the compression strength at a material age of 28 day is increased without having any negative influence on flowability and setting time.

Experimental Example 5

The same tests as in Experimental Example 1 were carried out except that different kinds of alum as shown in Table 26 were used. The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 26.
"Materials Used"
Alum a: potassium alum 12-hydrate, commercial product, Blaine 600 $cm^2/g$
Alum b: sodium aluminum sulfate 12-hydrate, commercial product, Blaine 700 $cm^2/g$
Alum c: ammonium alum 12-hydrate, commercial product, Blaine 600 $cm^2/g$
Alum d: iron alum 12-hydrate, commercial product, Blaine 600 $cm^2/g$
Alum e: chromium alum 12-hydrate, commercial product, Blaine 600 $cm^2/g$
Alum f: potassium alum anhydride, commercial product, Blaine 600 $cm^2/g$
Alum g: ammonium alum anhydride, commercial product, Blaine 700 $cm^2/g$
Alum h: iron alum mono-hydrate, commercial product, Blaine 600 $cm^2/g$
Alum i: iron alum anhydride, commercial product, Blaine 700 $cm^2/g$

TABLE 26

| Test No. | Kind of Alum | Flowability Reduction Time (sec) | Setting Time (min) | | Compression Strength (N/mm²) | | | Remarks |
|---|---|---|---|---|---|---|---|---|
| | | | Start | End | 3 hrs | 1 day | 28 days | |
| 1-5 | a | 3 | 0.75 | 4 | 3.4 | 14.2 | 35.7 | Example |
| 6-1 | b | 5 | 0.75 | 5 | 4.1 | 13.4 | 34.1 | Example |
| 6-2 | c | 3 | 0.75 | 5 | 3.4 | 11.7 | 33.1 | Example |
| 6-3 | d | 4 | 1 | 5 | 3.5 | 12.1 | 30.1 | Example |
| 6-4 | e | 25 | 4 | 15 | 3.3 | 9.9 | 27.7 | Example |
| 6-5 | f | 4 | 0.75 | 4 | 4.2 | 15.6 | 36.3 | Example |
| 6-6 | g | 4 | 0.75 | 4 | 3.6 | 12.7 | 30.1 | Example |
| 6-7 | h | 3 | 0.75 | 3 | 3.3 | 11.9 | 31.6 | Example |
| 6-8 | i | 3 | 0.75 | 3 | 3.3 | 12.8 | 32.9 | Example |

As in Table 26, the flowability reduction time was short, the setting time was not delayed and the compression strength was good irrespective of the type of alum. In addition, it can be seen that some types of alum are effective for expressing better properties.

Experimental Example 6

The same tests as in Experimental Example 1 were carried out except that different kinds of alkali carbonate as shown in Table 27 were used. The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 27.

"Materials Used"

Alkali carbonate A: commercial product, sodium carbonate, Blaine 1200 cm²/g

Alkali carbonate B commercial product, sodium sesqui-carbonate, Blaine 1400 cm²/g Alkali carbonate C commercial product, sodium bicarbonate, Blaine 800 cm²/g Alkali carbonate D: commercial product, lithium carbonate, Blaine 1000 cm²/g Alkali carbonate E: commercial product, potassium carbonate, Blaine 1200 cm²/g

TABLE 27

| Test No. | Kind of Alkali Carbonate | Flowability Reduction Time (sec) | Setting Time (min) | | Compression Strength (N/mm²) | | | Remarks |
|---|---|---|---|---|---|---|---|---|
| | | | Start | End | 3 hrs | 1 day | 28 days | |
| 1-5 | A | 3 | 0.75 | 4 | 3.4 | 14.2 | 35.7 | Example |
| 7-1 | B | 5 | 0.75 | 5 | 4.0 | 13.6 | 35.2 | Example |
| 7-2 | C | 5 | 0.75 | 8 | 3.7 | 11.9 | 35.4 | Example |
| 7-3 | D | 25 | 1 | 25 | 3.5 | 9.9 | 33.3 | Example |
| 7-4 | E | 5 | 0.75 | 9 | 3.9 | 14.5 | 33.1 | Example |

As in Table 27, the flowability reduction time was short, the setting time was not delayed and the compression strength was good irrespective of the type of alkali carbonate. In addition, it can be seen that some types of alkali carbonate are effective for expressing better properties.

Experimental Example 7

The same tests as in Experimental Example 1 were carried out except that calcium aluminates having a different molar ratio $CaO/Al_2O_3$ as in Table 28 were used. The powdered quick-setting agent was formulated so as to have the formulation of Test No. 1-5. The calcium aluminates were prepared to have Blaine of 5500±200 cm²/g/

80 g of the powdered quick-setting agent was added to mortar to prepare quick-setting mortar, and immediately after preparation, the flowability reduction time, the setting time and the compression strength thereof were measured. The results are shown in Table 28.

TABLE 28

| Test No. | Calcium Aluminate CaO/Al$_2$O$_3$ molar ratio | Flowability Reduction Time (sec) | Setting Time (min) Start | Setting Time (min) End | Compression Strength (N/mm$^2$) 3 hrs | Compression Strength (N/mm$^2$) 1 day | Compression Strength (N/mm$^2$) 28 days | Remarks |
|---|---|---|---|---|---|---|---|---|
| 1-5 | 2.5 | 3 | 0.75 | 4 | 3.4 | 14.2 | 35.7 | Example |
| 8-1 | 1.9 | 10 | 1.0 | 6 | 4.3 | 16.7 | 36.0 | Example |
| 8-2 | 2.0 | 4 | 0.75 | 5 | 4.3 | 16.1 | 36.2 | Example |
| 8-3 | 2.6 | 2 | 0.75 | 5 | 4.4 | 15.5 | 35.8 | Example |
| 8-4 | 3.0 | 2 | 0.75 | 6 | 4.0 | 15.1 | 33.3 | Example |
| 8-5 | 3.1 | 4 | 4.0 | 20 | 3.6 | 11.0 | 30.4 | Example |

From the results in Table 28, it can be seen that, when the molar ratio CaO/Al$_2$O$_3$ in calcium aluminates was 2.0 to 3.0, the flowability reduction time and the setting time were short and the compression strength was good.

Experimental Example 8

Concrete of 360 kg of cement, 216 kg of water, 1049 kg of fine aggregate and 716 kg of coarse aggregate (No. 6 crushed stone from Himekawa river system of Niigata prefecture, density 2.67 g/cm$^3$) was prepared. The concrete was pumped at a rate of 10 m$^3$/h using a concrete pump MKW-25SMT from SHINTEC Co., Ltd., and on the way, mixed to be a merged stream with compressed air from a separate system, and pneumatically conveyed. Further, at a point of 3 m before ejection, a powdered quick-setting agent shown in Table 29 below as mixed to be a merged stream with the thus-pneumatically conveyed concrete using a conveyer system DENKA NATMCREAT in such a manner that the agent could be 10 parts relative to 100 parts of the cement, thereby preparing SPRAY CONCRETE, which was then sprayed onto an iron plate through a nozzle tip. The initial strength, the long-term strength, the rebound ratio, and the crack repairing rate after spraying are shown in Table 29.

The same concrete as in Experimental Example 8 was mixed to be a merged stream with an ordinary quick-setting agent, DENKA NATMIC TYPE-5 (quick-setting agent No. T-5 containing a calcium aluminate as the main ingredient and not containing an alkali silicate) that had been pneumatically conveyed, in such a manner that the agent could be 10 parts (Test No. 8-15) relative to 100 parts of cement to prepare spray concrete, which was sprayed onto an iron plate through a nozzle tip. Also similarly, the quick-setting agent No. T-5 was mixed to be a merged stream with concrete that had been pneumatically conveyed in such a manner that the agent could be 7 parts (Test No. 8-16) relative to 100 parts of cement to prepare spray concrete, which was sprayed onto an iron plate through a nozzle tip. The initial strength, the long-term strength, the rebound ratio, and the crack repairing rate after spraying are shown in Table 29.

"Test Methods"

Initial Strength:
Sprayed onto a formwork according to JSCE-G561, the pull-out strength of the sample at a time of a material age of 10 minutes, 3 hours and 1 day was converted into a compression strength to determine the initial strength thereof.

Long-Term Strength:
Sprayed onto a formwork according to JSCE-F561, JIS A1107, a core of the sample was collected at a time of a material age of 7 days and 28 days, and the compression strength thereof was measured.

Rebound:
The rebound in spraying for 3 minutes to a simulated tunnel having an excavation cross-sectional surface of 15 m$^2$ was measured according to JSCE-F563, and the rebound ratio from the spray concrete used was determined according to the following expression.

Rebound Ratio=Amount of dropped spray concrete (kg)/amount of spray concrete used for spraying (kg)×100(%)   Expression)

The rebound ratio is preferably 20% or less.

Crack Repairing Rate:
Spray concrete was sprayed onto each of two formworks of 10 cm×10 cm×40 cm to prepare test bodies. Immediately after preparation, the two test bodies were fixed, as separated by a clearance of 0.1 mm therebetween in such a manner that the 40 cm surface could be in parallel to each other, and cured in water at 20° C. for 6 months, and the test bodies were observed with a microscope to determine the repairing rate for the clearance having a width of 0.1 mm.

The crack repairing rate is preferably 50% or more.

TABLE 29

| Test No. | Test No. of Powdered Quick-Setting Agent | Rebound (%) | Initial Strength (N/mm$^2$) 10 min | Initial Strength (N/mm$^2$) 3 hrs | Initial Strength (N/mm$^2$) 1 day | Long-Term Strength (N/mm$^2$) 7 days | Long-Term Strength (N/mm$^2$) 28 days | Crack Repairing Rate (%) | Remarks |
|---|---|---|---|---|---|---|---|---|---|
| 9-1 | 1-5 | 17 | 2.3 | 3.9 | 12.5 | 30.6 | 41.2 | 100 | Example |
| 9-2 | 1-1 | 18 | 1.9 | 4.2 | 10.8 | 29.5 | 40.3 | 100 | Example |
| 9-3 | 1-33 | 60 | 0 | 0.8 | 6.9 | 21.2 | 30.1 | 70 | Comparative Example |
| 9-4 | 1-36 | 80 | 0.8 | 3.3 | 11.8 | 25.2 | 33.9 | 40 | Comparative Example |
| 9-5 | 2-1 | 20 | 0.8 | 3.2 | 10.6 | 20.2 | 30.3 | 60 | Example |
| 9-6 | 2-5 | 15 | 2.1 | 4.0 | 15.4 | 29.7 | 40.2 | 100 | Example |
| 9-7 | 2-6 | 32 | 1.7 | 4.2 | 14.8 | 25.5 | 38.7 | 100 | Example |
| 9-8 | 3-2 | 15 | 1.5 | 4.1 | 13.1 | 24.8 | 35.3 | 60 | Example |

TABLE 29-continued

| Test No. | Test No. of Powdered Quick-Setting Agent | Rebound (%) | Initial Strength (N/mm²) | | | Long-Term Strength (N/mm²) | | Crack Repairing Rate (%) | Remarks |
|---|---|---|---|---|---|---|---|---|---|
| | | | 10 min | 3 hrs | 1 day | 7 days | 28 days | | |
| 9-9 | 5-4 | 28 | 1.4 | 3.9 | 10.7 | 20.1 | 30.4 | 60 | Example |
| 9-10 | 6-2 | 18 | 1.3 | 3.9 | 12.9 | 30.4 | 41.0 | 60 | Example |
| 9-11 | 6-3 | 30 | 1.0 | 3.4 | 10.3 | 27.3 | 38.1 | 70 | Example |
| 9-12 | 7-1 | 25 | 2.1 | 3.8 | 16.1 | 27.5 | 38.9 | 70 | Example |
| 9-13 | 7-4 | 22 | 2.2 | 4.2 | 16.2 | 28.1 | 38.8 | 70 | Example |
| 9-14 | 7-5 | 18 | 1.0 | 3.9 | 12.3 | 25.3 | 36.4 | 70 | Example |
| 9-15 | T-5 10 parts | 22 | 1.1 | 1.9 | 9.5 | 25.6 | 33.0 | 10 | Comparative Example |
| 9-16 | T-5 7 parts | 25 | 0.6 | 1.5 | 8.9 | 25.1 | 30.0 | 45 | Comparative Example |
| 9-17 | 1-30 | 20 | 2.3 | 4.5 | 12.1 | 25.6 | 35.4 | 70 | Example |

As in Table 29, the samples of Examples were good in all the initial strength, the long-term strength and the crack repairing rate. As Comparative Examples, there are known ordinary quick-setting agents of Test No. 9-15 and Test No. 9-16, but these are poor in improving the crack repairing rate. The rebound ratio is generally 20% or more, but some comparative samples had a higher rebound ratio than the general rate. On the other hand, it can be seen that some quick-setting agents of Examples of the invention have a more favorable rebound ratio.

Test No. 9-3 has a good crack repairing rate, but has an extremely long setting time (see Table 21) and is therefore impracticable as a powdered quick-setting agent of the present invention.

Experimental Example 9

The same test as in Experimental Example 1 was carried out except that, in Test No. 1-30, the test temperature was changed from 25° C. to 35° C. in (Test No. 10-1).

Also the same test as in Experimental Example 1 was carried out except that, in Test No. 1-37, the test temperature was changed from 25° C. to 35° C. in (Test No. 10-2).

The results are shown in Table 30 below.

TABLE 30

| Test No. | Test Temperature | Flowability Reduction Time (sec) | Setting Time (min) | | Compression Strength (N/mm²) | | | Remarks |
|---|---|---|---|---|---|---|---|---|
| | | | Start | End | 3 hrs | 1 day | 28 days | |
| 1-30 | 25° C. | 6 | 0.75 | 9 | 4.1 | 11.4 | 33.1 | Example |
| 1-37 | 25° C. | 5 | 0.75 | 7 | 1.0 | 7.7 | 29.0 | Reference Example |
| 10-1 | 35° C. | 5 | 0.75 | 7 | 1.0 | 7.7 | 29.0 | Example |
| 10-2 | 35° C. | 5 | 0.75 | 7 | 1.0 | 6.2 | 21.1 | Reference Example |

As in Table 30, the sample of Test No. 10-1 was good all in the initial strength, the long-term strength and the crack repairing rate at a high temperature. This is presumed to be because of increase in the ettringite production amount by supplementation with calcium sulfate Examples of Fourth Aspect of Invention Experimental Example 1

Alkali carbonate A, calcium aluminate, calcium hydroxide, alum a, sodium silicate and aluminum sulfate (1) were mixed according to the blending formulation shown in Table 1 and Table 2 to prepare a powdered quick-setting agent, while on the other hand, mortar composed of 800 g of cement 2000 g of fine aggregate, 400 g of water was prepared, and 80 g of the powdered quick-setting agent was added to the mortar to prepare quick-setting mortar (quick-setting material), and immediately after preparation, the flowability reduction time, the setting time and the compression strength of the material were measured. The results are shown in Table 31 and Table 32.

The materials used and the test methods are described below.

"Materials Used"

Cement: commercial product, normal Portland cement, density 3.15 g/cm³

Fine aggregate: river sand from Himekawa river system of Niigata prefecture, density 2.61 g/cm³

Water: industrial water

Alkali carbonate A: commercial product, sodium carbonate, Blaine 1200 cm²/g

Calcium aluminate: Raw materials were crushed and mixed so as to have a molar ratio $CaO/Al_2O_3$ of 2.5, then melted in an electric furnace and rapidly cooled. Degree of vitrification 90%, Blaine 5500 cm²/g Calcium hydroxide: commercial product corresponding to Slaked Lime No. 2 defined in JIS R 9001

Alum a: potassium alum 12-hydrate, commercial product, Blaine 600 cm²/g

Sodium silicate: $SiO_2/Na_2O$ molar ratio 1.0, Blaine 600 cm²/g, commercial product, anhydride Aluminum sulfate (1): aluminum sulfate, commercial product, 14 to 18-hydrate, 98% passed through a sieve mesh 1.2 mm.

"Test Methods"

Flowability Reduction Time:

A powdered quick-setting agent was added to the prepared mortar, then kneaded with a mortar mixer for 10 seconds at a high-speed mode, and the time for mortar flowability reduction was measured by finger touch.

In finger touch, a state where a finger could not penetrate into the sample as compared with a fresh sample immediately after kneading with the quick-setting agent was considered to be a state of flowability reduction.

Setting Time:

A powdered quick-setting agent was added to the prepared mortar, then quickly packed in a formwork exclusive for proctor test, and the start time for setting and the end time of setting after addition of the powdered quick-setting agent were measured (according to ASTM C403).

Compression Strength:

Like that for measurement of the setting time, the compression strength (N/mm²) after preparation of the quick-setting mortar was measured. The material age was 3 hours, 1 day and 28 days (according to JSCE D102).

TABLE 31

| Test No. | Formulation of Powdered Quick-Setting Agent (part) | | | | | Aluminum Sulfate (1) | Flowability Reduction Time (sec) | Setting Time (min) | | Compression Strength (N/mm²) | | | Remarks |
|---|---|---|---|---|---|---|---|---|---|---|---|---|---|
| | Alkali Carbonate A | Calcium Aluminate | Calcium Hydroxide a | Alum a | Sodium Silicate | | | Start | End | 3 hrs | 1 day | 28 days | |
| 1-1 | 0 | 50 | 20 | 10 | 5 | 10 | 2 | 0.5 | 1 | 1.3 | 6.7 | 32.6 | Example |
| 1-2 | 1 | 50 | 20 | 10 | 5 | 10 | 2 | 0.5 | 1 | 1.4 | 7.2 | 32.2 | Example |
| 1-3 | 3 | 50 | 20 | 10 | 5 | 10 | 2 | 0.5 | 1 | 1.6 | 8.2 | 31.7 | Example |
| 1-4 | 5 | 50 | 20 | 10 | 5 | 10 | 2 | 0.5 | 1.5 | 1.8 | 11.8 | 31.3 | Example |
| 1-5 | 10 | 50 | 20 | 10 | 5 | 10 | 2 | 0.5 | 1.5 | 2.1 | 12.5 | 31.1 | Example |
| 1-6 | 20 | 50 | 20 | 10 | 5 | 10 | 2 | 0.5 | 1.5 | 2.2 | 13.6 | 31.0 | Example |
| 1-7 | 25 | 50 | 20 | 10 | 5 | 10 | 3 | 0.75 | 2 | 2.3 | 15.1 | 19.6 | Example |
| 1-8 | 10 | 0 | 20 | 10 | 5 | 10 | 7 | 25 | 200 | 0.3 | 7.0 | 25.1 | Comparative Example |
| 1-9 | 10 | 25 | 20 | 10 | 5 | 10 | 5 | 1 | 5 | 0.6 | 9.3 | 32.0 | Example |
| 1-10 | 10 | 30 | 20 | 10 | 5 | 10 | 5 | 1 | 4 | 1.1 | 9.9 | 31.8 | Example |
| 1-11 | 10 | 40 | 20 | 10 | 5 | 10 | 2 | 0.75 | 3 | 1.8 | 11.2 | 32.0 | Example |
| 1-5 | 10 | 50 | 20 | 10 | 5 | 10 | 2 | 0.5 | 1.5 | 2.1 | 12.5 | 31.1 | Example |
| 1-12 | 10 | 70 | 20 | 10 | 5 | 10 | 1 | 0.5 | 1.5 | 2.3 | 11.9 | 30.1 | Example |
| 1-13 | 10 | 75 | 20 | 10 | 5 | 10 | 1 | 0.5 | 1 | 2.9 | 9.0 | 28.6 | Example |
| 1-14 | 10 | 50 | 0 | 10 | 5 | 10 | 4 | 0.75 | 1.5 | 1.7 | 10.1 | 24.3 | Example |
| 1-15 | 10 | 50 | 5 | 10 | 5 | 10 | 3 | 0.5 | 1.5 | 1.7 | 11.1 | 28.5 | Example |
| 1-16 | 10 | 50 | 10 | 10 | 5 | 10 | 2 | 0.5 | 1.5 | 2.1 | 12.6 | 31.7 | Example |
| 1-5 | 10 | 50 | 20 | 10 | 5 | 10 | 2 | 0.5 | 1.5 | 2.1 | 12.5 | 31.1 | Example |
| 1-17 | 10 | 50 | 25 | 10 | 5 | 10 | 2 | 0.5 | 1 | 2.2 | 12.5 | 32.0 | Example |
| 1-18 | 10 | 50 | 35 | 10 | 5 | 10 | 2 | 0.5 | 1 | 2.5 | 10.3 | 31.8 | Example |

TABLE 32

| Test No. | Formulation of Powdered Quick-Setting Agent (part) | | | | | Aluminum Sulfate (1) | Flowability Reduction Time (sec) | Setting Time (min) | | Compression Strength (N/mm²) | | | Remarks |
|---|---|---|---|---|---|---|---|---|---|---|---|---|---|
| | Alkali Carbonate A | Calcium Aluminate | Calcium Hydroxide a | Alum a | Sodium Silicate | | | Start | End | 3 hrs | 1 day | 28 days | |
| 1-19 | 10 | 50 | 20 | 0 | 5 | 10 | 6 | 0.5 | 1.5 | 1.6 | 6.6 | 26.8 | Example |
| 1-20 | 10 | 50 | 20 | 0.5 | 5 | 10 | 5 | 0.5 | 1 | 1.7 | 9.4 | 27.9 | Example |
| 1-21 | 10 | 50 | 20 | 5 | 5 | 10 | 4 | 0.5 | 1 | 1.8 | 11.4 | 30.4 | Example |
| 1-5 | 10 | 50 | 20 | 10 | 5 | 10 | 2 | 0.5 | 1.5 | 2.1 | 12.5 | 31.1 | Example |
| 1-22 | 10 | 50 | 20 | 20 | 5 | 10 | 2 | 0.5 | 1 | 2.3 | 12.7 | 31.5 | Example |
| 1-23 | 10 | 50 | 20 | 25 | 5 | 10 | 2 | 0.5 | 1 | 2.4 | 12.5 | 31.5 | Example |
| 1-24 | 10 | 50 | 20 | 10 | 0 | 10 | 30 | 1 | 3 | 0.7 | 12.1 | 32.0 | Comparative Example |
| 1-25 | 10 | 50 | 20 | 10 | 0.5 | 10 | 20 | 0.75 | 1.5 | 1.4 | 12.9 | 32.1 | Example |
| 1-26 | 10 | 50 | 20 | 10 | 1 | 10 | 10 | 0.5 | 1.5 | 1.8 | 12.6 | 32.0 | Example |
| 1-5 | 10 | 50 | 20 | 10 | 5 | 10 | 2 | 0.5 | 1.5 | 2.1 | 12.5 | 31.1 | Example |
| 1-27 | 10 | 50 | 20 | 10 | 10 | 10 | 2 | 0.5 | 0.75 | 2.5 | 11.6 | 31.6 | Example |
| 1-28 | 10 | 50 | 20 | 10 | 20 | 10 | 2 | 0.5 | 0.75 | 2.6 | 9.3 | 28.2 | Example |
| 1-29 | 10 | 50 | 20 | 10 | 25 | 10 | 1 | 0.5 | 0.75 | 2.5 | 8.9 | 24.5 | Example |
| 1-30 | 0 | 80 | 0 | 0 | 20 | 10 | 4 | 0.5 | 1 | 2.2 | 8.7 | 28.6 | Example |
| 1-31 | 10 | 50 | 20 | 10 | 5 | 0 | 3 | 0.75 | 4 | 0.9 | 12.1 | 32.0 | Reference Example |
| 1-32 | 0 | 50 | 20 | 10 | 5 | 0 | 2 | 0.5 | 3 | 0.5 | 3.3 | 33.5 | Reference Example |
| 1-33 | 10 | 0 | 20 | 10 | 5 | 0 | 5 | 30 | 180 | 0.3 | 7.5 | 24.0 | Comparative Example |

TABLE 32-continued

| | Formulation of Powdered Quick-Setting Agent (part) | | | | | Aluminum Sulfate (1) | Flowability Reduction time (sec) | Setting Time (min) | | Compression Strength (N/mm²) | | | |
|---|---|---|---|---|---|---|---|---|---|---|---|---|---|
| Test No. | Alkali Carbonate A | Calcium Aluminate | Calcium Hydroxide a | Alum a | Sodium Silicate | | | Start | End | 3 hrs | 1 day | 28 days | Remarks |
| 1-34 | 10 | 50 | 0 | 10 | 5 | 0 | 5 | 0.75 | 5 | 0.6 | 10.5 | 22.0 | Reference Example |
| 1-35 | 10 | 50 | 20 | 0 | 5 | 0 | 7 | 0.5 | 3 | 0.7 | 5.1 | 25.0 | Reference Example |
| 1-36 | 10 | 50 | 20 | 10 | 0 | 0 | 45 | 1 | 4 | 0.5 | 12.5 | 32.0 | Comparative Example |
| 1-37 | 0 | 80 | 0 | 0 | 20 | 0 | 5 | 0.75 | 7 | 1.0 | 7.7 | 29.0 | Reference Example |

From Table 31 and Table 32, it can be seen that, by containing a calcium aluminate, a sodium silicate and an aluminum sulfate, and preferably further containing, in addition thereto, a calcium hydroxide, an alum and an alkali carbonate, the flowability reduction time was short, the setting time was not delayed and the compression strength was good. In particular, when an aluminum sulfate is contained, the setting time was shortened and the short-time strength was improved. It can be seen that the content of each component has its own appropriate level.

Experimental Example 2

The same tests as in Experimental Example 1 were carried out except that sodium silicates having a different molar ratio $SiO_2/Na_2O$ were used as in Table 33. The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 33 below.

TABLE 33

| Test No. | Sodium Silicate $SiO_2/Na_2O$ molar ratio | Flowability Reduction Time (sec) | Setting Time (min) | | Compression Strength (N/mm²) | | | Remarks |
|---|---|---|---|---|---|---|---|---|
| | | | Start | End | 3 hrs | 1 day | 28 days | |
| 2-1 | 0.45 | 2 | 0.5 | 2.0 | 1.1 | 6.5 | 23.6 | Example |
| 2-2 | 0.5 | 2 | 0.5 | 1.5 | 1.7 | 11.7 | 31.8 | Example |
| 2-3 | 0.67 | 2 | 0.5 | 1.5 | 1.8 | 11.5 | 31.5 | Example |
| 2-4 | 0.9 | 2 | 0.5 | 1.5 | 2.0 | 12.1 | 31.1 | Example |
| 1-5 | 1.0 | 2 | 0.5 | 1.5 | 2.1 | 12.5 | 31.1 | Example |
| 2-5 | 1.3 | 3 | 0.5 | 1.5 | 2.0 | 12.1 | 30.0 | Example |
| 2-6 | 1.5 | 3 | 0.75 | 2 | 1.8 | 10.9 | 29.9 | Example |
| 2-7 | 2.0 | 7 | 0.75 | 2 | 1.3 | 7.1 | 24.6 | Example |

From Table 33, it can be seen that, by containing a calcium aluminate and a sodium silicate, the flowability reduction time was short, the setting time was not delayed and the compression strength was good. It is further known that the molar ratio of $SiO_2/Na_2O$ of sodium silicate has an appropriate numerical range for expressing better properties.

Experimental Example 3

The same tests as in Experimental Example 1 were carried out except that different kinds of sodium silicate hydrate as shown in Table 34 were used. The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 34.

TABLE 34

| Test No. | Sodium Silicate Hydrate | Flowability Reduction Time (sec) | Setting Time (min) | | Compression Strength (N/mm²) | | | Remarks |
|---|---|---|---|---|---|---|---|---|
| | | | Start | End | 3 hrs | 1 day | 28 days | |
| 1-5 | Anhydride | 2 | 0.5 | 1.5 | 2.1 | 12.6 | 31.1 | Example |
| 3-1 | 5-Hydrate | 2 | 0.5 | 1.5 | 2.1 | 12.5 | 31.1 | Example |
| 3-2 | 9-Hydrate | 1 | 0.5 | 1.5 | 2.2 | 10.4 | 30.7 | Example |

From Table 34, it is considered that any type of sodium silicate hydrate is effective for a powdered quick-setting agent.

Experimental Example 4

Experimental Example 4-1

The same tests as in Experimental Example 1 were carried out except that aluminum sulfate (2) or (3) was used in place of aluminum sulfate (1). The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 35-1.

"Materials Used"

Aluminum sulfate (2): aluminum sulfate, 8-hydrate, 99% passed through a sieve mesh 1.2 mm.

Aluminum sulfate (3): aluminum sulfate, anhydride, 99% passed through a sieve mesh 1.2 mm.

TABLE 35-1

| Test No. | Aluminum Sulfate | Flowability Reduction Time (sec) | Setting Time (min) | | Compression Strength (N/mm²) | | | Remarks |
|---|---|---|---|---|---|---|---|---|
| | | | Start | End | 3 hrs | 1 day | 28 days | |
| 4-1 | (2) | 2 | 0.5 | 1.5 | 2.5 | 12.8 | 32.2 | Example |
| 4-2 | (3) | 5 | 0.5 | 1.5 | 2.6 | 12.8 | 32.0 | Example |
| 1-5 | (1) | 2 | 0.5 | 1.5 | 2.1 | 12.6 | 31.1 | Example |

As in Table 35-1, the flowability reduction time was short, the setting time was not delayed and the compression strength was good even using aluminum sulfate having a different number of hydrates.

Experimental Example 4-2

The same tests as in Experimental Example 1 were carried out except that the blending ratio of aluminum sulfate (1) was changed as in Table 35-2 below. Except for the blending ratio of aluminum sulfate (1) therein, the powdered quick-setting agent was formulated so as to have the formulation of Test No. 1-5. The results are shown in Table 35-2.

TABLE 35-2

| Test No. | Blending Ratio of Aluminum Sulfate (1) (part) | Flowability Reduction Time (sec) | Setting Time (min) | | Compression Strength (N/mm²) | | | Remarks |
|---|---|---|---|---|---|---|---|---|
| | | | Start | End | 3 hrs | 1 day | 28 days | |
| 1-31 | 0 | 3 | 0.75 | 4 | 0.9 | 12.1 | 32.0 | Comparative Example |
| 4-1 | 3 | 3 | 0.75 | 3 | 1.3 | 12.6 | 32.0 | Example |
| 4-2 | 5 | 3 | 0.75 | 3 | 1.7 | 12.8 | 32.0 | Example |
| 4-3 | 7.5 | 2 | 0.5 | 2 | 2.0 | 13.1 | 32.0 | Example |
| 4-4 | 20 | 2 | 0.5 | 1.5 | 2.1 | 12.1 | 32.0 | Example |
| 4-5 | 25 | 2 | 0.5 | 1.0 | 2.1 | 12.0 | 31.0 | Example |
| 4-6 | 30 | 1 | 0.5 | 1.0 | 2.2 | 11.0 | 29.0 | Example |
| 1-5 | 10 | 2 | 0.5 | 1.5 | 2.1 | 12.5 | 31.1 | Example |

As in Table 35-2, it is confirmed that the flowability reduction time is short and the setting performance and the compression strength change little when the blending amount of aluminum sulfate (1) is 5 to 25 parts.

Experimental Example 5

The same tests as in Experimental Example 1 were carried out except that different kinds of alum as shown in Table 36 were used. The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 36.

"Materials Used"
Alum a: potassium alum 12-hydrate, commercial product, Blaine 600 cm$^2$/g
Alum b: sodium aluminum sulfate 12-hydrate, commercial product, Blaine 700 cm$^2$/g
Alum c: ammonium alum 12-hydrate, commercial product, Blaine 600 cm$^2$/g
Alum d: iron alum 12-hydrate, commercial product, Blaine 600 cm$^2$/g
Alum e: chromium alum 12-hydrate, commercial product, Blaine 600 cm$^2$/g
Alum f: potassium alum anhydride, commercial product, Blaine 600 cm$^2$/g
Alum g: ammonium alum anhydride, commercial product, Blaine 700 cm$^2$/g
Alum h: iron alum mono-hydrate, commercial product, Blaine 600 cm$^2$/g
Alum i: iron alum anhydride, commercial product, Blaine 700 cm$^2$/g

TABLE 36

| Test No. | Kind of Alum | Flowability Reduction Time (sec) | Setting Time (min) | | Compression Strength (N/mm$^2$) | | | Remarks |
| --- | --- | --- | --- | --- | --- | --- | --- | --- |
| | | | Start | End | 3 hrs | 1 day | 28 days | |
| 1-5 | a | 2 | 0.5 | 1.5 | 2.1 | 12.5 | 31.1 | Example |
| 5-1 | b | 3 | 0.5 | 1.5 | 2.1 | 11.4 | 31.4 | Example |
| 5-2 | c | 3 | 0.5 | 1.5 | 1.9 | 9.8 | 31.1 | Example |
| 5-3 | d | 4 | 0.75 | 2 | 1.7 | 9.9 | 30.4 | Example |
| 5-4 | e | 15 | 0.75 | 2 | 1.6 | 7.6 | 27.7 | Example |
| 5-5 | f | 2 | 0.5 | 1.5 | 2.0 | 12.8 | 32.1 | Example |
| 5-6 | g | 2 | 0.5 | 1.5 | 1.8 | 9.7 | 26.5 | Example |
| 5-7 | h | 2 | 0.5 | 1.5 | 1.7 | 9.3 | 27.9 | Example |
| 5-8 | i | 2 | 0.5 | 1.5 | 1.7 | 10.2 | 28.3 | Example |

As in Table 36, the flowability reduction time was short, the setting time was not delayed and the compression strength was good irrespective of the type of alum. In addition, it can be seen that some types of alum are effective for expressing better properties.

Experimental Example 6

The same tests as in Experimental Example 1 were carried out except that different kinds of alkali carbonate as shown in Table 37 were used. The powdered quick-setting agent was formulated so as to have the formulation of Test No. 1-5.

80 g of the powdered quick-setting agent was added to mortar to prepare quick-setting mortar, and immediately after preparation, the flowability reduction time, the setting time and the compression strength thereof were measured. The results are shown in Table 37.

"Materials Used"
Alkali carbonate A: commercial product, sodium carbonate, Blaine 1200 cm$^2$/g
Alkali carbonate B commercial product, sodium sesqui-carbonate, Blaine 1400 cm$^2$/g
Alkali carbonate C commercial product, sodium bicarbonate, Blaine 800 cm$^2$/g
Alkali carbonate D: commercial product, lithium carbonate, Blaine 1000 cm$^2$/g
Alkali carbonate E: commercial product, potassium carbonate, Blaine 1200 cm$^2$/g

TABLE 37

| Test No. | Kind of Alkali Carbonate | Flowability Reduction Time (sec) | Setting Time (min) | | Compression Strength (N/mm$^2$) | | | Remarks |
|---|---|---|---|---|---|---|---|---|
| | | | Start | End | 3 hrs | 1 day | 28 days | |
| 1-5 | A | 2 | 0.5 | 1.5 | 2.1 | 12.5 | 31.1 | Example |
| 6-1 | B | 3 | 0.5 | 1.5 | 1.9 | 12.1 | 32.6 | Example |
| 6-2 | C | 3 | 0.5 | 2 | 1.9 | 10.1 | 33.3 | Example |
| 6-3 | D | 10 | 0.75 | 3 | 1.5 | 9.6 | 28.9 | Example |
| 6-4 | E | 3 | 0.75 | 3 | 2.0 | 10.7 | 32.5 | Example |

As in Table 37, the flowability reduction time was short, the setting time was not delayed and the compression strength was good irrespective of the type of alkali carbonate. In addition, it can be seen that some types of alkali carbonate are effective for expressing better properties.

Experimental Example 7

The same tests as in Experimental Example 1 were carried out except that calcium aluminates having a different molar ratio CaO/Al$_2$O$_3$ as in Table 38 were used. The powdered quick-setting agent was formulated so as to have the formulation of Test No. 1-5. The calcium aluminates were prepared to have Blaine of 5500±200 cm$^2$/g.

80 g of the powdered quick-setting agent was added to mortar to prepare quick-setting mortar, and immediately after preparation, the flowability reduction time, the setting time and the compression strength thereof were measured. The results are shown in Table 38.

TABLE 38

| Test No. | Calcium Aluminate CaO/Al$_2$O$_3$ molar ratio | Flowability Reduction Time (sec) | Setting Time (min) | | Compression Strength (N/mm$^2$) | | | Remarks |
|---|---|---|---|---|---|---|---|---|
| | | | Start | End | 3 hrs | 1 day | 28 days | |
| 1-5 | 2.5 | 2 | 0.5 | 1.5 | 2.1 | 12.5 | 31.1 | Example |
| 7-1 | 1.9 | 5 | 0.5 | 1.5 | 2.2 | 13.5 | 32.3 | Example |
| 7-2 | 2.0 | 2 | 0.5 | 1.5 | 2.2 | 13.8 | 33.1 | Example |
| 7-3 | 2.6 | 2 | 0.5 | 1.5 | 2.0 | 12.5 | 32.9 | Example |
| 7-4 | 3.0 | 2 | 0.5 | 1.5 | 1.9 | 12.1 | 29.7 | Example |
| 7-5 | 3.1 | 3 | 1.0 | 8 | 1.7 | 9.2 | 27.5 | Example |

From the results in Table 38, it can be seen that, when the molar ratio CaO/Al$_2$O$_3$ in calcium aluminates was 2.0 to 3.0, the flowability reduction time and the setting time were short and the compression strength was good.

Experimental Example 8

Concrete of 360 kg of cement, 216 kg of water, 1049 kg of coarse aggregate and 716 kg of coarse aggregate (No. 6 crushed stone from Himekawa river system of Niigata prefecture, density 2.67 g/cm$^3$) was prepared. The concrete was pumped at a rate of 10 m$^3$/h using a concrete pump MKW-25SMT from SHINTEC Co., Ltd., and on the way, mixed to be a merged stream with compressed air from a separate system, and pneumatically conveyed. Further, at a point of 3 m before ejection, a powdered quick-setting agent shown in Table 39 below as mixed to be a merged stream with the thus-pneumatically conveyed concrete using a conveyer system DENKA NATMCREAT in such a manner that the agent could be 10 parts relative to 100 parts of the cement, thereby preparing SPRAY CONCRETE, which was then sprayed onto an iron plate through a nozzle tip. The initial strength, the long-term strength, the rebound ratio, and the crack repairing rate after spraying are shown in Table 39.

The same concrete as in Experimental Example 8 was mixed to be a merged stream with an ordinary quick-setting agent, DENKA NATMIC TYPE-5 (quick-setting agent No. T-5 containing a calcium aluminate as the main ingredient and not containing an alkali silicate) that had been pneumatically conveyed, in such a manner that the agent could be 10 parts (Test No. 8-15) relative to 100 parts of cement to prepare spray concrete, which was sprayed onto an iron plate through a nozzle tip. Also similarly, the quick-setting agent No. T-5 was mixed to be a merged stream with concrete that had been pneumatically conveyed in such a manner that the agent could be 7 parts (Test No. 8-16) relative to 100 parts of cement to prepare spray concrete, which was sprayed onto an iron plate through a nozzle tip. The initial strength, the long-term strength, the rebound ratio, and the crack repairing rate after spraying are shown in Table 39.

"Test Methods":

Initial Strength:
Sprayed onto a formwork according to JSCE-G561, the pull-out strength of the sample at a time of a material age of 10 minutes, 3 hours and 1 day was converted into a compression strength to determine the initial strength thereof.

Long-Term Strength:
Sprayed onto a formwork according to JSCE-F561, JIS A1107, a core of the sample was collected at a time of a material age of 7 days and 28 days, and the compression strength thereof was measured.

Rebound:
The rebound in spraying for 3 minutes to a simulated tunnel having an excavation cross-sectional surface of 15 m$^2$ was measured according to JSCE-F563, and the rebound ratio from the spray concrete used was determined according to the following expression. The test temperature was 25° C.

Rebound Ratio=Amount of dropped spray concrete (kg)/amount of spray concrete used for spraying (kg)×100(%)     Expression)

The rebound ratio is preferably 20% or less.

Crack Repairing Rate:

Spray concrete was sprayed onto each of two formworks of 10 cm×10 cm×40 cm to prepare test bodies. Immediately after preparation, the two test bodies were fixed, as separated by a clearance of 0.1 mm therebetween in such a manner that the 40 cm surface could be in parallel to each other, and cured in water at 20° C. for 6 months, and the test bodies were observed with a microscope to determine the repairing rate for the clearance having a width of 0.1 mm.

The crack repairing rate is preferably 50% or more.

TABLE 39

| Test No. | Test No. of Powdered Quick-Setting Agent | Rebound (%) | Initial Strength (N/mm²) 10 min | 3 hrs | 1 day | Long-Term Strength (N/mm²) 7 days | 28 days | Crack Repairing Rate (%) | Remarks |
|---|---|---|---|---|---|---|---|---|---|
| 8-1 | 1-5 | 12 | 1.7 | 2.5 | 13.0 | 27.6 | 35.3 | 100 | Example |
| 8-2 | 1-1 | 14 | 0.6 | 2.3 | 6.8 | 26.5 | 34.4 | 100 | Example |
| 8-3 | 1-33 | 52 | 0 | 0.6 | 6.2 | 20.1 | 27.0 | 70 | Comparative Example |
| 8-4 | 1-36 | 75 | 0.5 | 1.5 | 8.0 | 22.2 | 30.5 | 30 | Comparative Example |
| 8-5 | 2-1 | 19 | 0.5 | 1.9 | 7.5 | 20.5 | 28.3 | 60 | Example |
| 8-6 | 2-5 | 15 | 1.1 | 2.7 | 13.3 | 25.9 | 33.3 | 100 | Example |
| 8-7 | 2-6 | 23 | 0.9 | 2.2 | 10.8 | 20.4 | 30.4 | 100 | Example |
| 8-8 | 3-2 | 14 | 0.8 | 2.3 | 11.3 | 20.8 | 31.1 | 50 | Example |
| 8-9 | 5-4 | 25 | 0.6 | 2.0 | 8.9 | 18.9 | 27.8 | 60 | Example |
| 8-10 | 6-2 | 17 | 0.6 | 2.1 | 10.1 | 27.1 | 32.6 | 60 | Example |
| 8-11 | 6-3 | 25 | 0.5 | 1.9 | 8.0 | 25.2 | 31.1 | 70 | Example |
| 8-12 | 7-1 | 20 | 1.3 | 2.8 | 14.0 | 24.1 | 31.5 | 70 | Example |
| 8-13 | 7-4 | 18 | 1.1 | 2.5 | 13.0 | 24.2 | 32.3 | 70 | Example |
| 8-14 | 7-5 | 15 | 0.4 | 1.9 | 10.1 | 23.1 | 29.0 | 70 | Example |
| 8-15 | T-5 10 pts | 22 | 1.1 | 1.9 | 9.5 | 25.6 | 33.0 | 10 | Comparative Example |
| 8-16 | T-5 7 pts | 25 | 0.6 | 1.5 | 8.9 | 25.1 | 30.0 | 45 | Comparative Example |
| 8-17 | 1-30 | 16 | 1.2 | 2.5 | 9.5 | 22.2 | 31.3 | 70 | Example |

As in Table 39, the samples of Examples were good in all the initial strength, the long-term strength and the crack repairing rate. As Comparative Examples, there are known ordinary quick-setting agents of Test No. 8-15 and Test No. 8-16, but these are poor in improving the crack repairing rate. The rebound ratio is generally 20% or more, but some comparative samples had a higher rebound ratio than the general rate. On the other hand, it can be seen that some quick-setting agents of Examples of the invention have a more favorable rebound ratio.

Test No. 8-3 has a good crack repairing rate, but has an extremely long setting time (see Table 31) and is therefore impracticable as a powdered quick-setting agent of the present invention.

Experimental Example 9

The same test as in Experimental Example 1 was carried out except that, in Test No. 1-30, the test temperature was changed from 25° C. to 35° C. in (Test No. 9-1).

Also the same test as in Experimental Example 1 was carried out except that, in Test No. 1-37, the test temperature was changed from 25° C. to 35° C. in (Test No. 9-2).

The results are shown in Table 40 below.

TABLE 40

| Test No. | Rebound Test Temperature and Result | Flowability Reduction Time (sec) | Setting Time (min) Start | End | Compression Strength (N/mm²) 3 hrs | 1 day | 28 days | Remarks |
|---|---|---|---|---|---|---|---|---|
| 1-30 | 25° C., 16% | 6 | 0.75 | 9 | 4.1 | 11.4 | 33.1 | Example |
| 1-37 | 25° C., 19% | 5 | 0.75 | 7 | 1.0 | 7.7 | 29.0 | Reference Example |

TABLE 40-continued

| Test No. | Rebound Test Temperature and Result | Flowability Reduction Time (sec) | Setting Time (min) Start | Setting Time (min) End | Compression Strength (N/mm²) 3 hrs | Compression Strength (N/mm²) 1 day | Compression Strength (N/mm²) 28 days | Remarks |
|---|---|---|---|---|---|---|---|---|
| 9-1 | 35° C., 18% | 6 | 0.75 | 9 | 4.3 | 10.9 | 31.9 | Example |
| 9-2 | 35° C., 40% | 10 | 2 | 30 | 0.5 | 4.5 | 22.3 | Reference Example |

As in Table 40, the sample of Test No. 9-1 was good all in the rebound, the initial strength, the long-term strength and the crack repairing rate at a high temperature.

INDUSTRIAL APPLICABILITY

Using the powdered quick-setting agent of the present invention, adhesiveness of spray concrete improves and, in addition, even when some cracks form therein, spray concrete containing the agent exhibits a self-repairing function. According to the present invention, therefore, a material most suitable for a water contact environment such as a spring-fed area can be provided.

The invention claimed is:

1. A powdered quick-setting agent, comprising
a calcium aluminate;
a sodium silicate;
at least one selected from the group consisting of an alkali metal sulfate in an amount of 3 to 25 parts by mass in 100 parts by mass of the powdered quick-setting agent, an alkaline earth metal sulfate in an amount of 10 to 60 parts by mass in 100 parts by mass of the powdered quick-setting agent, wherein a Blaine's specific surface area of the alkaline earth metal sulfate is 3000 cm²/g or more, and an aluminum sulfate in an amount of 5 to 25 parts by mass in 100 parts by mass of the powdered quick-setting agent.

2. The powdered quick-setting agent according to claim 1, wherein a molar ratio of $SiO_2$ to $Na_2O$ in the sodium silicate is 0.5 to 1.5.

3. The powdered quick-setting agent according to claim 1, wherein a number of hydrates in the sodium silicate is 9 or less.

4. The powdered quick-setting agent according to claim 1, wherein a molar ratio of CaO to $Al_2O_3$ in the calcium illuminate is 2.0 to 3.0.

5. The powdered quick-setting agent according to claim 1, further comprising at least one selected from the group consisting of an alkali carbonate, a calcium hydroxide, and an alum.

6. The powdered quick-setting agent according to claim 5, wherein the alum is present, and wherein the alum is at least one selected from the group consisting of a potassium alum, a sodium alum, and an ammonium alum.

7. The powdered quick-setting agent according to claim 1, comprising the calcium acuminate in an amount of 30 to 80 parts by mass and the sodium silicate in an amount of 0.5 to 20 parts by mass in 100 parts by mass of the powdered quick-setting agent.

8. The powdered quick-setting agent according to claim 5, comprising the alkali carbonate in an amount of 1 to 20 parts by mass, the calcium hydroxide in an amount of 5 to 30 parts by mass, and the alum in an amount of 0.5 to 30 parts by mass in 100 parts by mass of the powdered quick-setting agent.

9. The powdered quick-setting agent according to claim 1, wherein the aluminum sulfate is present, and wherein a number of hydrates in the aluminum sulfate is in a range of 5 to 18.

10. A quick setting material prepared by blending a powdered quick-setting agent of claim 1 in a spray mortar or a spray concrete.

11. The quick-setting material according to claim 10, wherein the spray mortar or the spray concrete further comprises a blast furnace slag.

12. A quick-setting material hardened product of a quick-setting material of claim 10, wherein cracks existing in a surface thereof, the cracks having a maximum width of 0.1 mm, are repaired 50% or more relative to a total projected area of the cracks after being in a water contact environment for at least 6 months.

13. A spraying method, comprising:
mixing and combining a spray mortar or a spray concrete while conveying with a powdered quick-setting agent of claim 1 to form a combined stream, and
spraying the combined stream to a subject.

* * * * *